US012728887B2

(12) United States Patent
Gupta et al.

(10) Patent No.: US 12,728,887 B2
(45) Date of Patent: Sep. 8, 2026

(54) MACHINE LOCALIZATION ACCURACY

(71) Applicant: NVIDIA Corporation, Santa Clara, CA (US)

(72) Inventors: Vishisht Gupta, Santa Clara, CA (US); Amir Akbarzadeh, San Jose, CA (US); Yu Sheng, San Diego, CA (US)

(73) Assignee: NVIDIA Corporation, Santa Clara, CA (US)

( * ) Notice: Subject to any disclaimer, the term of this patent is extended or adjusted under 35 U.S.C. 154(b) by 278 days.

(21) Appl. No.: 18/446,649

(22) Filed: Aug. 9, 2023

(65) Prior Publication Data

US 2025/0058796 A1 Feb. 20, 2025

(51) Int. Cl.
*B60W 60/00* (2020.01)
*G01C 21/00* (2006.01)

(52) U.S. Cl.
CPC ....... *B60W 60/001* (2020.02); *G01C 21/3867* (2020.08); *B60W 2520/14* (2013.01)

(58) Field of Classification Search
CPC ........... B60W 60/001; B60W 2520/14; B60W 40/11; B60W 40/112; B60W 40/114; B60W 40/00; B60W 40/10; B60W 50/00; B60W 2050/0043; G01C 21/3867; G01C 21/20; G01C 21/005; G01C 21/1652; G01C 21/1656; G01C 21/18
See application file for complete search history.

(56) References Cited

U.S. PATENT DOCUMENTS 10,309,778 B2 6/2019 Zhang et al.
10,692,244 B2 6/2020 Gu et al.
11,074,717 B2 7/2021 Tremblay et al.
11,488,418 B2 11/2022 Iqbal et al.
11,670,001 B2 6/2023 Mousavian et al.
12,131,550 B1 * 10/2024 Braley ................. G06V 10/751
2016/0377437 A1 * 12/2016 Brannstrom ......... G05D 1/0274 701/501
2020/0124421 A1 * 4/2020 Kang ...................... G01S 17/06
2021/0063162 A1 * 3/2021 Moskowitz ............ G01C 21/28
2022/0066456 A1 * 3/2022 Ebrahimi Afrouzi ........................ G06F 3/04883
2022/0155075 A1 * 5/2022 Jeon ................... G01C 21/1656
2022/0205789 A1 * 6/2022 Wada ..................... G01C 21/32
2022/0398775 A1 * 12/2022 Streem .................... G06T 17/05

* cited by examiner

*Primary Examiner* — Anne Marie Antonucci
*Assistant Examiner* — Connor L Knight
(74) *Attorney, Agent, or Firm* — IRON SUMMIT IP LLP

(57) ABSTRACT

In various examples, accuracy determinations for localization in autonomous and semi-autonomous systems and applications are described herein. Systems and methods are disclosed that determine one or more errors associated with vehicle localization using various types of sensor data generated using a vehicle. For instance, a first component of the vehicle may use a map and first sensor data to determine an estimated pose of the vehicle. A second component of the vehicle may then determine the error(s) associated with the estimated pose based on both actual motion of the vehicle within the environment, as determined using second sensor data, and comparing features represented by the first sensor data to features represented by the map. In some examples, the second component may further determine information associated with the error(s), such as one or more uncertainties associated with the error(s).

20 Claims, 22 Drawing Sheets

SERVER(S) 1578

CPU 1580(A)

CPU 1580(B)

PCIE SWITCH 1582(A)

PCIE SWITCH 1582(B)

PCIE SWITCH 1582(C)

PCIE SWITCH 1582(D)

1586

GPU 1584(A)

GPU 1584(B)

GPU 1584(C)

GPU 1584(D)

GPU 1584(E)

GPU 1584(F)

GPU 1584(G)

GPU 1584(H)

1588

NETWORK(S) 1590

1592

1594

1500

MACHINE LOCALIZATION ACCURACY

BACKGROUND

Mapping and localization are common processes for autonomous and semi-autonomous driving functionality. High definition (HD) maps, sensor perception, or a combination thereof are often used to localize a vehicle with respect to an HD map in order to make planning and control decisions. For example, a vehicle may generate sensor data using one or more sensors, such as one or more image sensors, one or more LiDAR sensors, one or more RADAR sensors, and/or so forth. The vehicle may then compare features represented by the sensor data to features represented by the HD map. Based on the comparison, the vehicle may determine a pose associated with the vehicle within an environment, such as a location and/or an orientation of the vehicle within the environment. However, even though such a localization process may provide precise results, there still may be an error associated with the determined pose. In some examples, this error may depend on one or more factors, such as noise, the number and/or type of features represented by the sensor data, whether the sensor data is occluded, whether the HD map is complete in an area of the environment for which the vehicle is navigating, and/or other factors.

As such, some techniques have been developed in order to estimate one or more errors between the localization pose of the vehicle and the actual pose of the vehicle. For example, during a time window, a system may determine a previous pose of the vehicle at the start of the time window and then a final pose of the vehicle at the end of the time window using a motion of the vehicle during the time window. The system may then determine, at the end of the time window, the error(s) associated with localization using the final pose and the localization pose. For instance, the system may determine the error(s) based on one or more differences between the final pose and the localization pose. While this technique does provide an estimate for the error(s), the error(s) may change based on the size of the time window, which may make the error(s) less relevant. Additionally, this technique does not allow for using error bounds associated with the error(s).

SUMMARY

Embodiments of the present disclosure relate to accuracy determinations for localization in autonomous and semi-autonomous systems and applications. Systems and methods are disclosed that determine one or more errors associated with vehicle localization using various types of sensor data generated using a vehicle. For instance, a first component of the vehicle may use a map and first sensor data, such as image data, LiDAR data, and/or RADAR data, to determine an estimated pose of the vehicle. A second component of the vehicle may then determine the error(s) associated with the estimated pose based on both actual motion of the vehicle within the environment, as determined using second sensor data, and comparing features represented by the first sensor data to features represented by the map. In some examples, the second component may further determine information associated with the error(s), such as one or more uncertainties associated with the error(s). Additionally, in some examples, the system(s) may perform one or more processes based on the error(s), such as determining whether to use the estimated pose when navigating.

In contrast to conventional systems, such as those described above, the current systems, in some embodiments, determine the error(s) associated with the vehicle localization by fusing different types of sensor data, such as the motion data representing the actual motion of the vehicle as well as the image data, the LiDAR data, the RADAR data, and/or so forth. For instance, the current systems may propagate an error determined by using the motion data with an error determined using the image data, the LiDAR data, the RADAR data, and/or so forth in order to determine a final error(s) associated with the vehicle localization, which may be more accurate as compared to using motion alone. Additionally, in contrast to the conventional systems, the current systems, in some embodiments, do not use require using factors that may change the error, such as time windows. Rather, the current systems may continuously determine and/or update the error(s) of the vehicle localization as new data (e.g., sensor data) is received from the sensors of the vehicle.

BRIEF DESCRIPTION OF THE DRAWINGS

The present systems and methods for accuracy determinations for localization in autonomous and semi-autonomous systems and applications are described in detail below with reference to the attached drawing figures, wherein.

DETAILED DESCRIPTION

Figure 1:
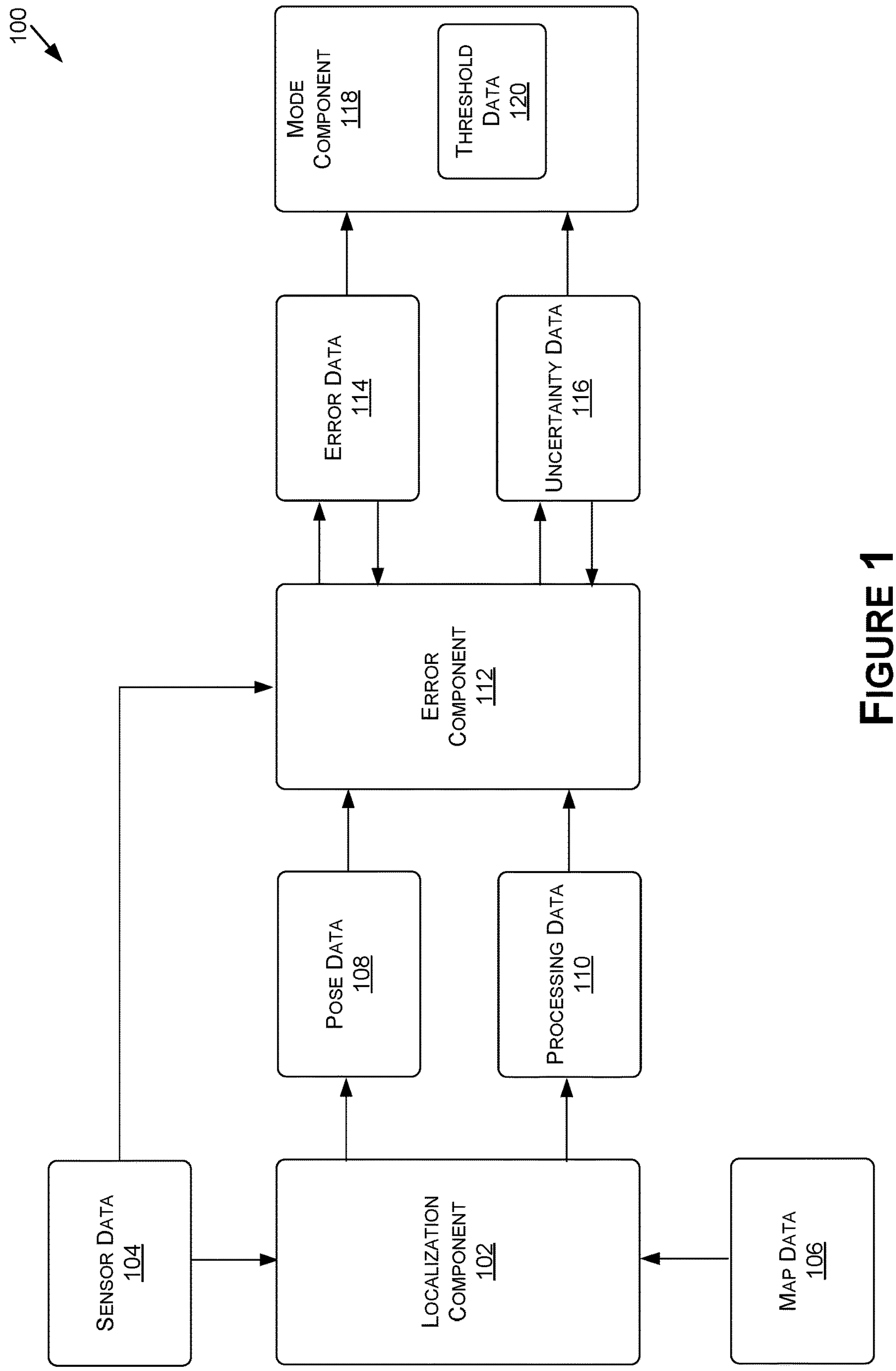
FIG. 1 illustrates an example data flow diagram for a process of determining errors associated with localization of vehicles, in accordance with some embodiments of the present disclosure.

Systems and methods are disclosed related to accuracy determinations for localization in autonomous and semi-autonomous systems and applications. Although the present disclosure may be described with respect to an example autonomous or semi-autonomous vehicle 1500 (alternatively referred to herein as "vehicle 1500," "ego-vehicle 1500," "machine 1500," or "ego-machine 1500") an example of which is described with respect to FIGS. 15A-15D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to machine localization, this is not intended to be limiting, and the systems and methods described herein may be used in augmented reality, virtual reality, mixed reality, robotics, security and surveillance, autonomous or semi-autonomous machine applications, and/or any other technology spaces where machine or other object localization may be used.

For instance, the system(s) (e.g., a first component) may use one or more techniques to localize a vehicle (and/or other type of machine) within an environment. In some examples, and as described in more detail herein, the system (s) localizes the vehicle by determining an initial pose of the vehicle using sensor data (referred to, in some examples, as "first sensor data") generated using one or more location sensors of the vehicle, such as a Global Positioning System (GPS). The system(s) then refines and/or updates the initial pose of the vehicle using sensor data (referred to, in some examples, as "second sensor data") generated using one or more other sensors of the vehicle, such as one or more image sensors (e.g., one or more cameras), one or more LiDAR sensors, one or more RADAR sensors, and/or the like. For instance, to refine the initial pose, the system(s) may compare one or more features represented by the second sensor data to one or more features represented by map data, where the map data represents a map of an environment for which the vehicle is located. Based at least on the comparing, the system(s) may update the initial pose of the vehicle to an estimated pose (e.g., a localization pose) of the vehicle within the environment. As described herein, a pose may represent a location (e.g., a x-coordinate location, a y-coordinate location, and/or a z-coordinate location) of the vehicle, an orientation (e.g., a yaw, a pitch, and/or a roll) of the vehicle, and/or any other location, pose, or orientation information.

In some examples, the localization (e.g., the estimated location and/or pose) of the vehicle may include one or more errors based at least on one or more factors, such as noise associated with the localization processing, the second sensor data not representing an adequate number of features (e.g., the vehicle is navigating through a tunnel), the second sensor data being obstructed (e.g., based on weather conditions), the map being incomplete for the environment for which the vehicle is navigating, and/or so forth. For instance, as described herein, the error(s) may include a first error in a first coordinate direction (e.g., the x-coordinate direction) between the estimated pose and an actual pose of the vehicle, a second error in a second coordinate direction (e.g., the y-coordinate direction) between the estimated pose and the actual pose of the vehicle, a third error in a third coordinate direction (e.g., the z-coordinate direction) between the estimated pose and the actual pose of the vehicle, a fourth error in a yaw difference between the estimated pose and the actual pose of the vehicle, a fifth error in a roll difference between the estimated pose and the actual pose of the vehicle, a sixth error in a pitch difference between the estimated pose and the actual pose of the vehicle, and/or so forth. As such, the system(s) (e.g., a second component) may use one or more techniques to determine the error(s) associated with the localization.

For instance, the system(s) may use a previous pose associated with the vehicle along with sensor data (referred to, in some examples, as "third sensor data") generated using one or more motion sensors (e.g., one or more inertial measurement unit (IMU) sensors, etc.) to determine a true pose associated with the vehicle. In some examples, the pose may be considered a "true" pose based on the assumption that the motion data is accurate and/or substantially accurate, at least for short time periods and/or short distances of travel associated with the vehicle. As such, in some examples, the true pose may include and/or correspond to the actual pose of the vehicle. The system(s) may then determine one or more differences between the true pose and the estimated pose, such as one or more location differences (e.g., differences in the x-coordinate direction, the y-coordinate direction, and/or the z-coordinate location) and/or one or more orientation differences (e.g., differences in the yaw, the pitch, and/or the roll). In some examples, the system(s) may determine one or more errors (referred to, in some examples, as a "first error(s)") using the difference(s).

The system(s) may also compare one or more features represented by the second sensor data to one or more features represented by the map data. Based at least on the comparing, the system(s) may determine one or more correspondences between the feature(s) represented by the second sensor data and the feature(s) represented by the map data. In some examples, the system(s) performs the comparison and/or determination using one or more similar techniques as those used when performing the localization. For instance, in some examples, a correspondence may indicate whether a feature represented by the second sensor data matches a feature represented by the map data, whether a location of a feature as represented by the second sensor data matches a location of the same feature as represented by the map data, a cost associated with a feature represented by the second sensor data matching a feature represented by the map data, a cost associated with a pose that is based on the feature matching, and/or any other relationships that are based at least on the feature matching. Still, in some examples, the system(s) may determine one or more errors (referred to, in some examples, as a "second error(s)") using the correspondence(s).

The system(s) may then determine one or more final errors associated with the localization based at least on the difference(s) (e.g., the first error(s)) associated with the vehicle motion and the correspondence(s) (e.g., the second error(s)) associated with the vehicle localization. In some examples, the system(s) may use one or more algorithms to determine the final error(s), such as one or more algorithms associated with a Kalman filter and/or other type of estimation. In some examples, the system(s) may provide more weight to the difference(s) associated with the vehicle and/or to the correspondence(s) associated with the comparison when determining the final error(s). Additionally, in some examples, the system(s) may determine, such as by using one or more algorithms, one or more uncertainties associated with the final error(s).

The system(s) may continue to perform these processes as the vehicle navigates around the environment. For example, the system(s) may continue to perform these processes to determine a final error(s) at after a given time period such as, but not limited to, every 10 milliseconds, every 30 milliseconds, every 50 milliseconds, every second, and/or using any other period of time. Additionally, when performing these processes for a new iteration, the system(s) may use the final error(s) from the previous iteration, such as by continuing to update the final error(s) as the vehicle is navigating. Furthermore, in some examples, the system(s) may perform one or more processes using the final error(s) when navigating. For example, if the final error(s) is greater than one or more error thresholds, then the system(s) may cause the vehicle to operate in a first mode (e.g., an initialization mode) in which the estimated pose may not be trusted and/or used by one or more other systems of the vehicle. Additionally, if the final error(s) is less than or equal to the error threshold(s), then the system(s) may cause the vehicle to operate in a second mode in which the estimated pose may be trusted and/or used by the other system(s) of the vehicle.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, generative AI applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing one or more language models—such as one or more large language models (LLMs), systems incorporating one or more virtual machines (VMs), systems for performing synthetic data generation operations, systems implemented at least partially in a data center, systems for performing conversational AI operations, systems for performing one or more generative AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of determining errors associated with localization of vehicles, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1500 of FIGS. 15A-15D, example computing device 1600 of FIG. 16, and/or example data center 1700 of FIG. 17.

The process 100 may include a localization component 102 using sensor data 104 and map data 106 to localize a vehicle within an environment. In some examples, the localization component 102 localizes the vehicle by determining an initial pose of the vehicle using at least a portion of the sensor data 104, such as location data generated by a GPS. The localization component 102 may then refine and/or update the initial pose of the vehicle using at least a second portion of the sensor data 104, such as image data generated using one or more image sensors (e.g., one or more cameras), LiDAR data generated using one or more LiDAR sensors, RADAR data generated using one or more RADAR sensors, and/or the like. For instance, to refine the initial pose, the localization component 102 may compare one or more features represented by the sensor data 104 to one or more features represented by the map data 106, where the map data 106 represents a map of an environment for which the vehicle is located. Based at least on the comparing, the localization component 102 may update the initial pose of the vehicle to an estimated pose (e.g., a localization pose) of the vehicle within the environment. As described herein, a pose may represent a location (e.g., a x-coordinate location, a y-coordinate location, and/or a z-coordinate location) of the vehicle, an orientation (e.g., a yaw, a pitch, and/or a roll) of the vehicle, and/or any other location information.

Figure 2A:
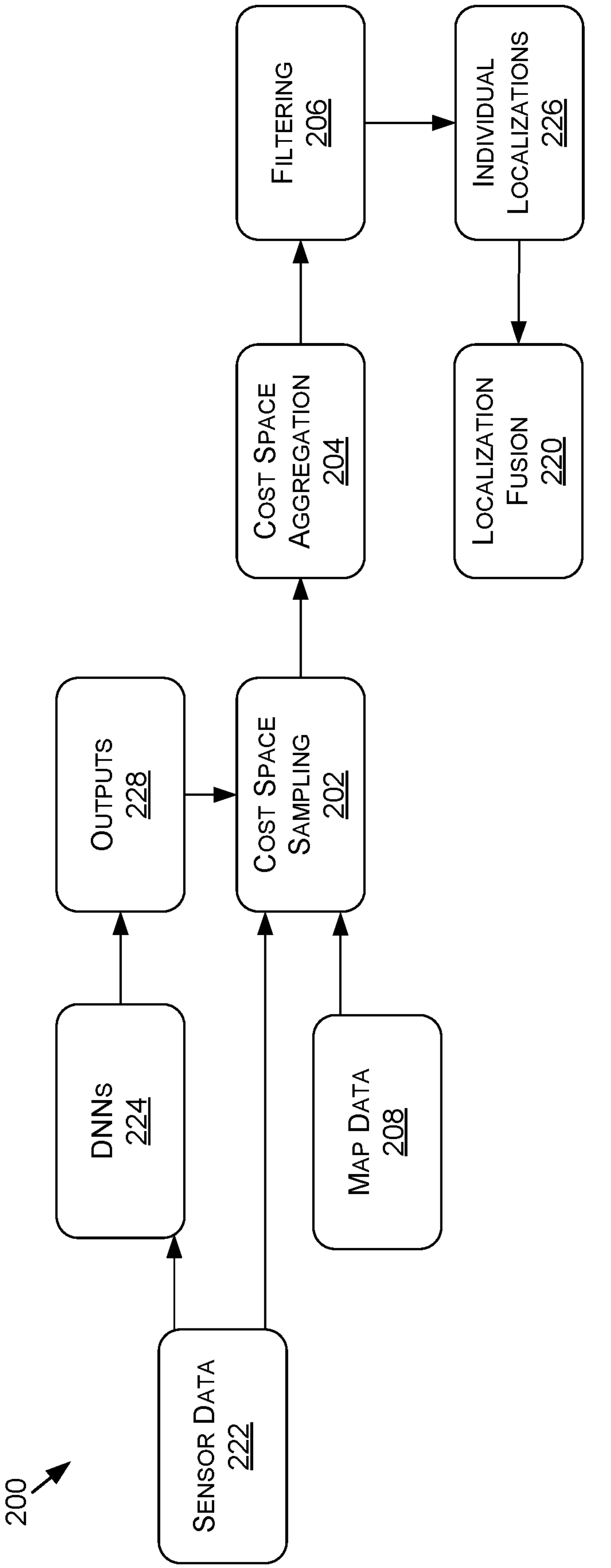
FIG. 2A illustrates a data flow diagram for a process of performing localization, in accordance with some embodiments of the present disclosure.

For more detail, FIG. 2A depicts a data flow diagram for a process 200 of performing localization, in accordance with some embodiments of the present disclosure. The process 200, in some examples, may be executed using a vehicle (e.g., the localization component 102). In some examples, one or more of the processes described with respect to the process 200 may be executed in parallel using one or more parallel processing units. For example, localization using different map layers may be executed in parallel with one or more other map layers. Within a single map layer, cost space sampling 202, cost space aggregation 204, and/or filtering 206 may be executed in parallel. For example, different poses may be sampled in parallel during cost space sampling 202 to more efficiently generate the cost space for the current frame or time step. In addition, because map data 208 (which may represent, and/or include, the map data 106) corresponding to layers of the maps may be stored on GPUs as textures, a texture lookup may be executed to quickly determine cost values for cost spaces—thereby leading to reduced run-time for each cost space analysis.

Figure 2B:
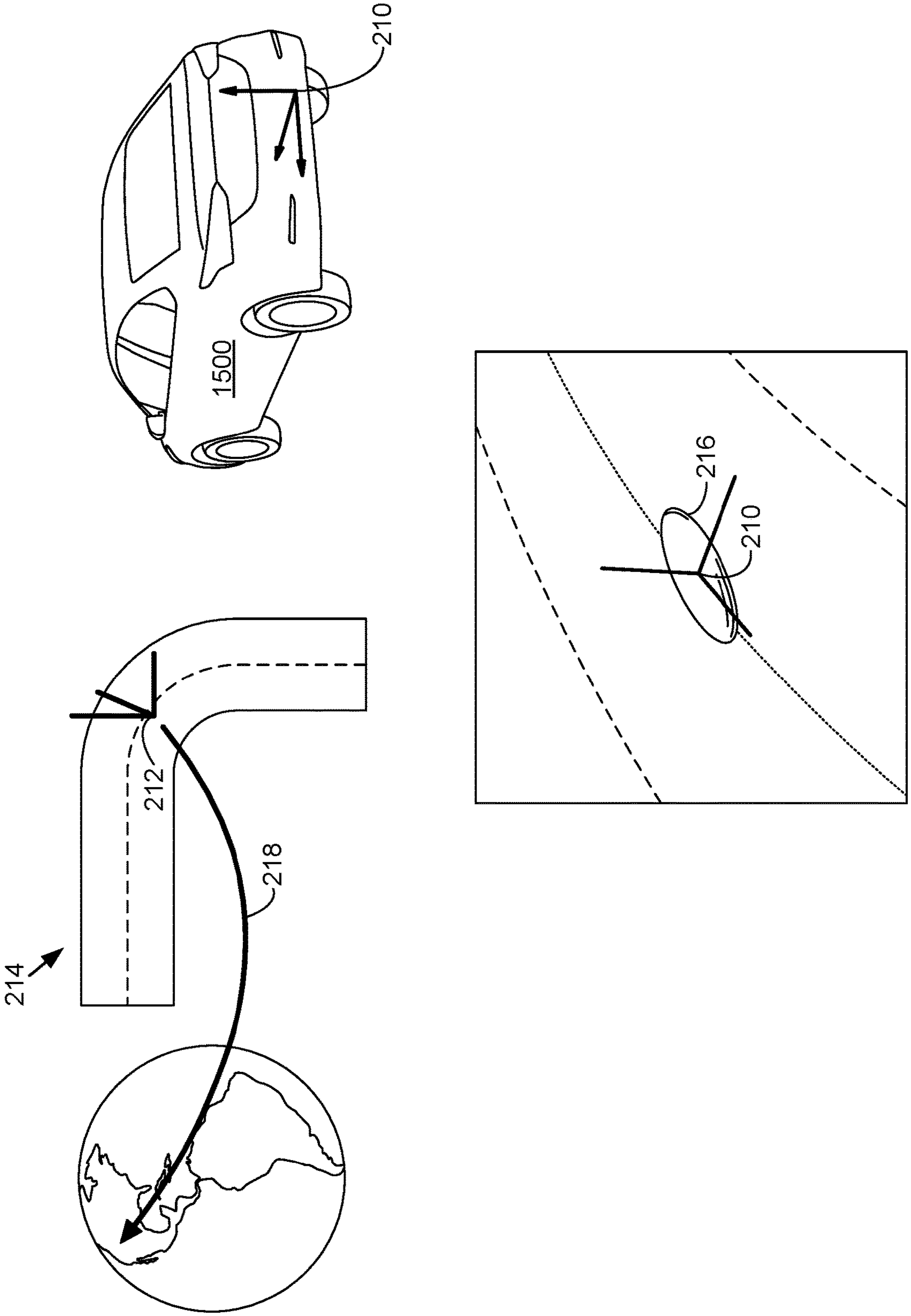
FIG. 2B illustrates a relationship between a vehicle origin, a road segment origin, and a global origin for localization, in accordance with some embodiments of the present disclosure.
Figure 3C:
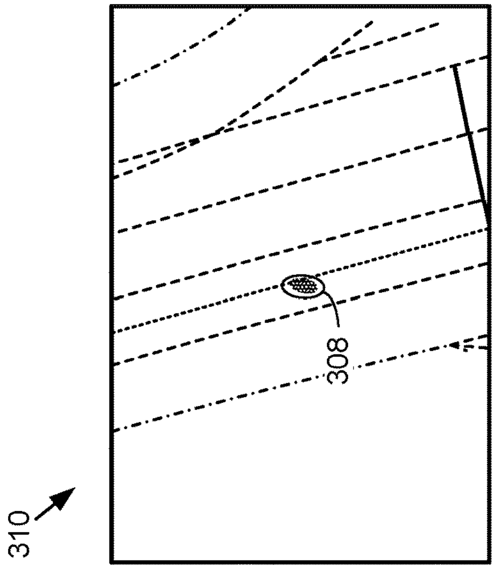
FIG. 3C illustrates a filtered aggregate cost space generated during localization, in accordance with some embodiments of the present disclosure.
Figure 3B:
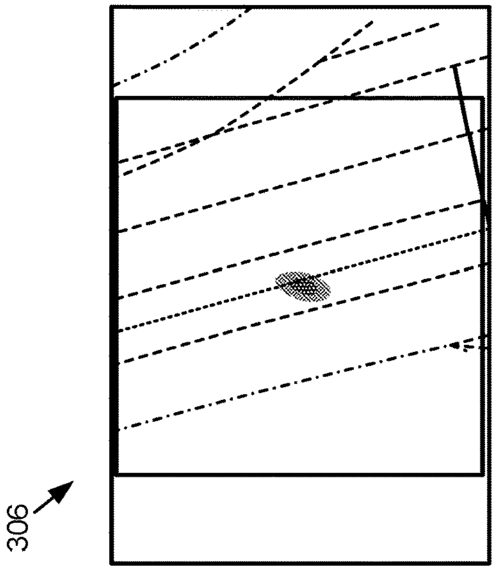
FIG. 3B illustrates an aggregate cost space corresponding to sampled cost spaces of a plurality of frames generated during localization, in accordance with some embodiments of the present disclosure.

The goal of the localization process 200, which is illustrated in FIG. 2B, may be to localize an origin 210 of a vehicle with respect to a local origin 212 of a road segment 214 of the fused HD map represented by the map data 208. For example, an ellipsoid(s) corresponding to a fused localization 216—described in more detail herein with respect to FIGS. 3A-3C—may be determined for the vehicle at a particular time step or frame using the localization process 200. The origin 210 of the vehicle may correspond to a reference point or origin of the vehicle, such as a center of a rear axle of the vehicle. The vehicle may be localized relative to the origin 212 of the road segment 214, and the road segment 214 may have a corresponding location 218 in a global coordinate system. As such, once the vehicle is localized to the road segment 214 of the HD map, the vehicle may be localized globally, as well. In some examples, the ellipsoid may be determined for each individual sensor modality—e.g., LiDAR localization, camera localization, RADAR localization, etc.—and the outputs of each localization technique may be fused via localization fusion 220. A final origin location may be generated—e.g., the origin 210 of the vehicle—and used as the localization result for the vehicle at the current frame or time step.

At a beginning of a drive, a current road segment 214 of the vehicle may be determined. In some examples, the current road segment 214 may be known from a last drive—e.g., when the vehicle was shut off, the last known road segment the vehicle was localized to may be stored. In other examples, the current road segment 214 may be determined. To determine the current road segment 214, GNSS data may be used to localize the vehicle globally, and then to determine the road segment(s) 214 corresponding to the global localization result. Where the results return two or more road segments 214, the road segment 214 with an origin 212 closest to the origin of the vehicle may be determined to be the current road segment 214. Once a current road segment 214 is determined, the road segment 214 may be determined to be a seed road segment for a breadth first search. The breadth first search may be executed to generate a local layout of road segments 214 that neighbor the current road segment 214 at a first level, then a second level of road segments 214 that neighbor the road segments 214 from the first level, and so on. Understanding the road segments 214 that neighbor the current road segment 214 may be useful for the localization process 200 because, as the vehicle moves from one road segment 214 to another road segment 214, the relative transforms between the road segments 214 may be used to update the sampled cost spaces generated for prior road segments 214 that are used in the aggregate cost spaces for localization. Once a vehicle moves from a seed road segment to a neighbor road segment, another breadth first search may be executed for the new road segment to generate an updated local layout, and this process may be repeated as the vehicle traverses the map from road segment to road segment. In addition, as described herein, as the vehicle moves from one road segment 214 to another road segment 214, the previously computed cost spaces (e.g., some number of previous cost spaces in a buffer, such as 50, 100, etc.) may be updated to reflect the same cost spaces but with respect to the origin 212 of the new road segment 214. As a result, the computed cost spaces may be carried over through road segments to generate the aggregate cost spaces via cost space aggregation 204.

The localization process 200 may use the sensor data 222 (which may represent, and/or include, the sensor data 104)—e.g., real-time sensor data 222 generated by a vehicle—the map data 208, and/or the outputs 228 to localize the vehicle at each time step or frame. For example, the sensor data 222, the outputs 228, and the map data 208 may be used to execute cost space sampling 202. The cost space sampling 202 may be different for different sensor modalities corresponding to different map layers. For example, cost space sampling 202 may be executed separately for LiDAR map layers (e.g., LiDAR point cloud layer, LiDAR maps image layer, and/or LiDAR voxel map layer), RADAR map layers (e.g., RADAR point cloud layers and/or RADAR maps image layers), and/or for the base layer (e.g., for landmark or camera based map layers). Within each sensor modality, the cost sampling may be executed using one or more different techniques, and the costs over the different techniques may be weighted to generate a final cost for a sampled pose. This process may be repeated for each pose in the cost space to generate a final cost space for a frame during localization. For example, a LiDAR intensity cost, a LiDAR elevation cost, and a LiDAR (sliced) point cloud cost (e.g., using a distance function) may be computed, then averaged or otherwise weighted, and used for the final cost for a pose or point on the cost space. Similarly, for camera or landmark based cost space sampling, a semantic cost may be computed and a geometric cost (e.g., using a distance function) may be computed, then averaged or otherwise weighted, and used for the final cost for a pose or point on the cost space. As a further example, RADAR point cloud cost (e.g., using a distance function) may be computed and used for the final cost for a pose or point on the cost space. As such, cost space sampling 202 may be executed to sample the cost of each different pose within a cost space. The cost space may correspond to some region in the map that may include only a portion of a current road segment 214, an entirety of a current road segment 214, the current road segment 214 and one or more adjoining road segments 214, and/or some other region of the overall fused HD map. As such, the size of a cost space may be a programmable parameter of the system.

A result of cost space sampling 202, for any individual sensor modality, may be a cost space that represents the geometric match or likelihood that the vehicle may be positioned with respect to each particular pose. For example, the points in the cost space may have corresponding relative locations with respect to a current road segment 214, and the cost space may indicate the likelihood or possibility that the vehicle is currently in each particular pose (e.g., (x, y, z) location with respect to the origin of the road segment 214 and axis angle about each of the x, y, and z axes).

Figure 3A:
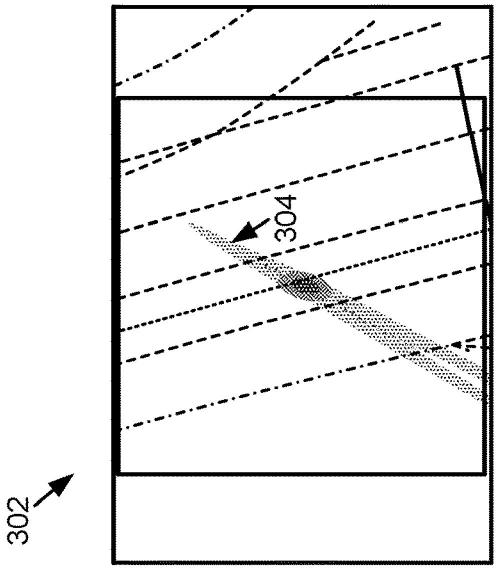
FIG. 3A illustrates a sampled cost space corresponding to a frame generated during localization, in accordance with some embodiments of the present disclosure.
Figure 4A:
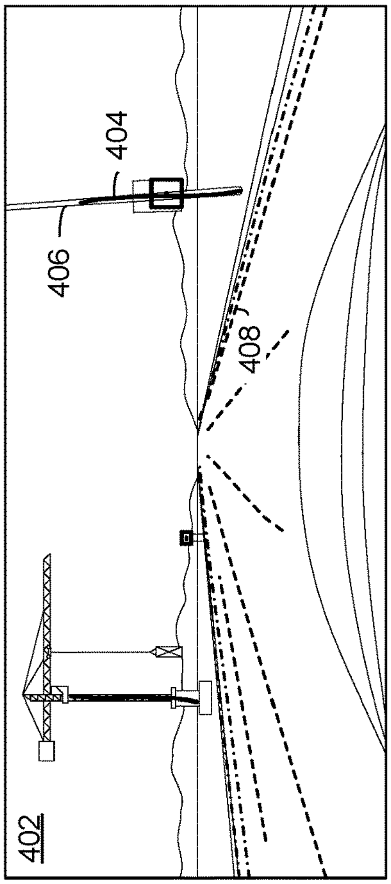
FIGS. 4A-4C illustrate example visualizations for sampling a pose of a sampled cost space for camera-based localization, in accordance with some embodiments of the present disclosure.
Figure 4B:
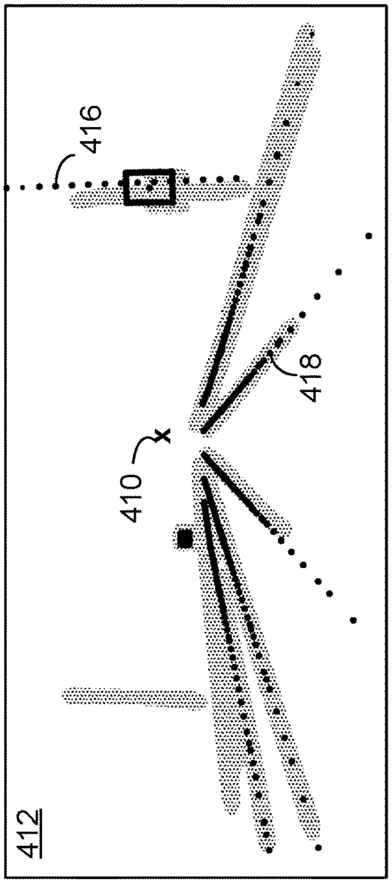
Figure 4C:
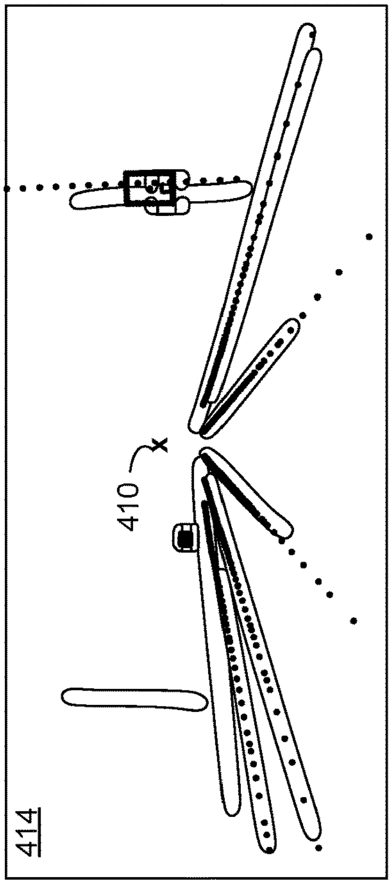

With reference to FIG. 3A, cost space 302 may represent a cost space for a sensor modality—e.g., a camera based cost space generated according to FIGS. 4A-4C. For example, the cost space 302 may represent the likelihood that a vehicle is currently in each of a plurality of poses—e.g., represented by points of the cost space 302—at a current frame. The cost space 302, although represented in 2D in FIG. 3A, may correspond to a 3D cost space (e.g., with (x, y, z) locations and/or axis angles for each of the x, y, and z axes). As such, the sensor data 222—e.g., before or after pre-processing—and/or the outputs 228 (e.g., detections of landmark locations in 2D image space and/or 3D image space) may be compared against the map data 208 for each of the plurality of poses. Where a pose does not match up well with the map data 208, the cost may be high, and the point in the cost space corresponding to the pose may be represented as such—e.g., represented in red, or with respect to FIG. 3A, represented in non-dotted or white portions. Where a pose does match up well with the map data 208, the cost may be low, and the point in the cost space corresponding to the pose may be represented as such—e.g., represented in green, or with respect to FIG. 3A, represented by the dotted points. For example, with reference to FIG. 3A, where the cost space 302 corresponds to visualization 402 of FIG. 10A, the dotted portions 304 may correspond to the low cost for the poses along the diagonal where a sign 404 may match up well with the predictions or outputs 228 of a DNNs 224. For example, at a pose on the left bottom of the dotted portions of the cost space, the predictions of the sign may line up well with the sign 404 from the map data 208, and similarly on the upper right portion of the dotted portions, the predictions of the sign from the corresponding poses may also line up well with the sign 404. As such, these points may be represented with low cost. However, due to noise and the high number of low cost poses, a single cost space 302 may not be accurate for localization—e.g., the vehicle cannot be located at each of the poses represented by the dotted portions 304. As such, an aggregate cost space 310 may be generated via cost space aggregation 204, as described herein.

Cost space sampling 202 may be executed separately for different sensor modalities, as described herein. For example, with respect to FIGS. 4A-4D, camera or landmark based cost spaces (e.g., corresponding to base layers of the fused HD map) may be generated using geometric cost and/or semantic cost analysis at each pose of the cost space. For example, at a given time step or frame, the outputs 228—e.g., landmark locations of lane dividers, road boundaries, signs, poles, etc.—may be computed with respect to an image(s), such as the image represented in visualization 401. The 3D landmark information from the map data 208 may be projected into 2D image space to correspond to the location of the 3D landmarks in the 2D image space relative to the current predictions of the vehicle at the current pose being sampled in the cost space. For example, the sign 404 may correspond to the 2D projection from the map data and sign 406 may correspond to the current prediction or output 228 from one or more DNN(s) 224. Similarly, lane divider 1014 may correspond to the 2D projection from the map data 208 and lane divider 408 may correspond to the current prediction or output 228 from one or more DNN(s) 224. In order to compute the cost for the current pose—e.g., represented by pose indicator 410—the current outputs 228 from the DNN(s) 224 may be converted to a distance function (e.g., where the predictions are divided into points, and each point has a zero cost at its center and the cost increases from the center moving outward until a max cost is reached, as represented by the white areas of the visualization 412) corresponding to the geometry of the predictions as represented in visualization 412, and the current outputs 228 may separately be converted to semantic labels for the predictions as represented in the visualization 414. In addition, the 2D projections of the 3D landmarks may be projected into the image space and each point from the 2D projections may be compared against the portion of the distance function representation that the projected point lands on to determine the associated cost. As such, the dotted portions may correspond to the distance function representation of the current predictions of the DNN(s) 224, and the dark solid lines or dots may represent the 2D projections from the map data 208. A cost may be computed for each point of the 2D projections, and an average cost may be determined using the relative costs from each point. For example, a cost at point 416 may be high, or max, and a cost at point 418 may be low—e.g., because the cost at point 418 lines up with a center of the distance function representation of the lane divider. This cost may correspond to the geometric cost for the current pose of the current frame. Similarly, semantic labels corresponding to the 2D projected points from the map data 208 may be compared against semantic information of the projections, as illustrated in FIG. 4C. As such, where a point does not semantically match, the cost may be set to a max, and where a point does match, the cost may be set to a min. These values may be averaged—or otherwise weighted—to determine the final semantic cost. The final semantic cost and the final geometric cost may be weighted to determine a final overall cost for updating the cost space (e.g., cost space 302). For example, for each point, the semantic cost may have to be low for the corresponding geometric cost to have a vote. As such, where semantic information does not match, the cost for that particular point may be set to a max. Where the semantic information does match, the cost may be set to a minimum, or zero, for the semantic cost, and the final cost for that point may represent the geometric cost. Ultimately, the point in the cost space corresponding to the current pose may be updated to reflect the final cost of all of the 2D projected points.

Figure 5B:
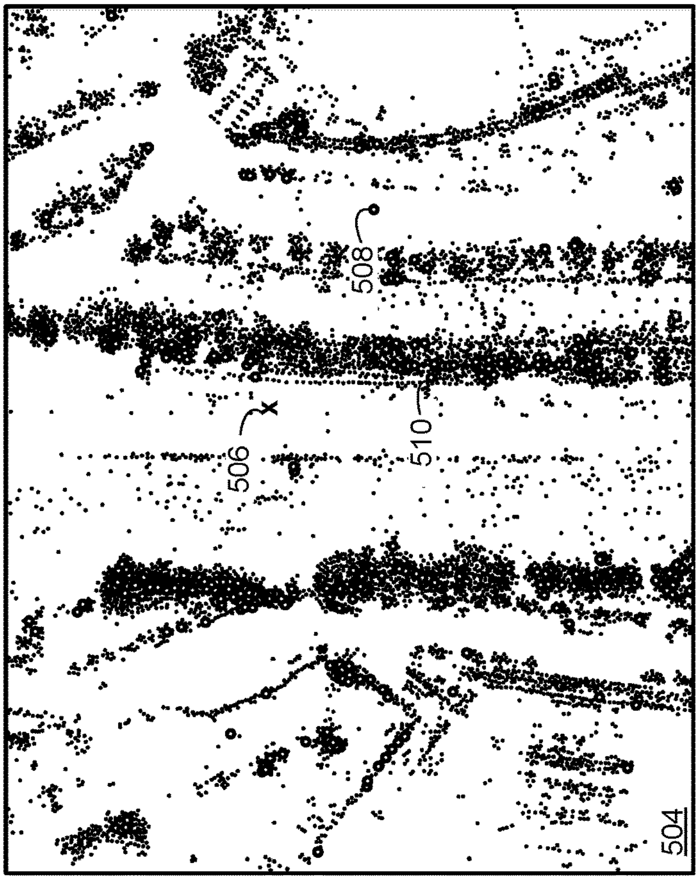
FIGS. 5A-5B illustrate example visualizations for sampling a pose of a sampled cost space for RADAR-based localization, in accordance with some embodiments of the present disclosure.
Figure 5A:
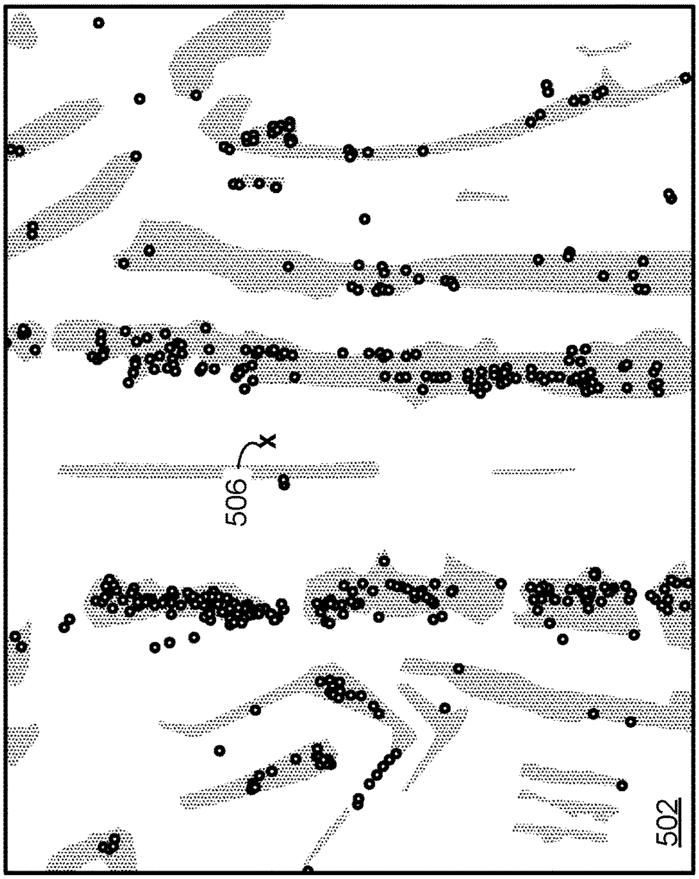

As another example, with respect to FIGS. 5A-5B, RADAR based cost spaces (e.g., corresponding to RADAR layers of the fused HD map) may be generated using distance functions corresponding to the map data 208 (e.g., a top down projection of the RADAR point cloud with each point converted to a distance function representation). For example, at a given time step or frame, the map data 208 corresponding to the RADAR point cloud—as represented in visualization 502—may be converted to a distance function, as represented in visualization 504—e.g., where each RADAR point may have a zero cost at its center with costs increasing to a max cost as the distance from the center increases. For example, with respect to visualization 504, the white portions of the visualization 502 may correspond to a max cost. In order to compute the cost for the current pose—e.g., represented by pose indicator 506—the RADAR data from the sensor data 222 may be converted to a RADAR point cloud and compared against the distance function representation of the RADAR point cloud (e.g., as represented in visualization 504). The hollow circles in the visualization 502 and 504 may correspond to the current RADAR point cloud predictions of the vehicle. As such, for each current RADAR point, a cost may be determined by comparing each current RADAR point to the distance function RADAR values that the current RADAR point corresponds to, or lands on. As such, a current RADAR point 508 may have a max cost while a current RADAR point 510 may have low cost—e.g., because the point 510 lands closely to a center of a point from the RADAR point cloud in the map data 208. Ultimately, an average or other weighting of each of the costs from the current RADAR points may be computed, and the final cost value may be used to update the cost space for the currently sampled pose.

As another example, with respect to FIGS. 6A-6D, LiDAR based cost spaces (e.g., corresponding to LiDAR layers of the fused HD map) may be generated using distance functions on a (sliced) LiDAR point cloud, LiDAR intensity maps, and/or LiDAR elevation maps. For example, for a given pose—as indicated by pose indicator 602—current or real-time LiDAR data (e.g., corresponding to the sensor data 222) may be generated and converted into values for comparison against an intensity map generated from the map data 208 (e.g., as illustrated in visualization 604), converted into values for comparison to an elevation map generated from the map data 208 (e.g., as illustrated in visualization 606), and a LiDAR point cloud of the map data 208 (e.g., as illustrated in visualization 608) may be converted to a distance function representation of the same (e.g., as illustrated in from visualization 610) for comparison to a current LiDAR point cloud corresponding to the sensor data 222. The LiDAR point cloud, in some examples, may correspond to a slice of the LiDAR point cloud, and one or more separate slices may be converted to a distance function representation and used to compute cost. The costs from elevation comparison, intensity comparison, and distance function comparison may be averaged or otherwise weighted to determine the final cost corresponding to the current pose on the LiDAR based cost map.

Figure 6A:
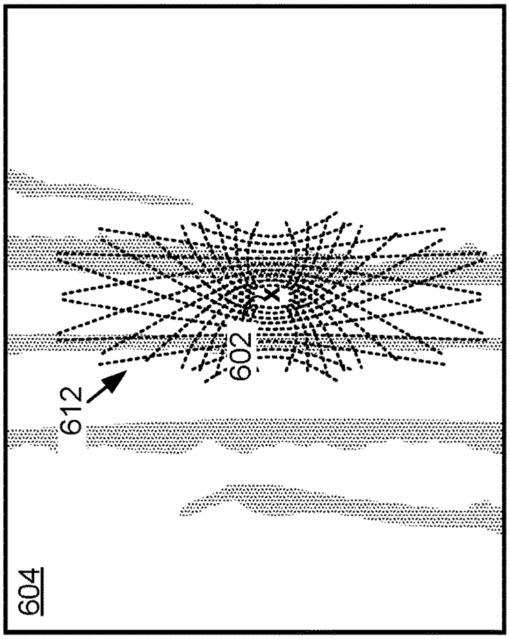
FIGS. 6A-6D illustrate example visualizations for sampling a pose of a sampled cost space for LiDAR-based localization, in accordance with some embodiments of the present disclosure.

For example, with respect to FIG. 6A, a LiDAR layer of the fused HD map represented by the map data 208 may include a LiDAR intensity (or reflectivity) image (e.g., a top down projection of the intensity values from the fused LiDAR data). For example, painted surfaces, such as lane markers, may have higher reflectivity, and this reflection intensity may be captured and used to compare the map data 208 to the current LiDAR sensor data. The current LiDAR sensor data from the vehicle may be converted to a LiDAR intensity representation 612 and compared against the LiDAR intensity image from the map data 208 at the current pose. For points of the current LiDAR intensity representation 612 that have a similar or matching intensity value as the points from the map data 208, the cost may be low, and where the intensity value does not match, the cost may be higher. For example, zero difference in intensity for a point may correspond to zero cost, a threshold difference and above may correspond to a max cost, and between the zero difference and the threshold difference the cost may be increase from zero cost to the max cost. The cost for each point of the current LiDAR intensity representation 612 may be averaged or otherwise weighted with each other point to determine the cost for the LiDAR intensity comparison.

Figure 6B:
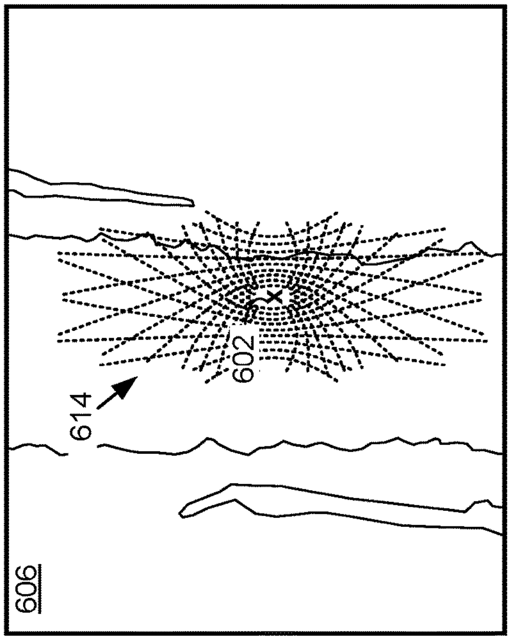

As another example, with respect to FIG. 6B, a LiDAR layer of the fused HD map represented by the map data 208 may include a LiDAR elevation image (e.g., a top down projection of the elevation values, resulting in a top down depth map). The current LiDAR sensor data from the vehicle may be converted to a LiDAR elevation representation 614 and compared against the LiDAR elevation image generated from the map data 208 at the current pose. For points of the current LiDAR elevation representation 614 that have a similar or matching elevation value as the points from the map data 208, the cost may be low, and where the elevation value does not match, the cost may be higher. For example, zero difference in elevation for a point may correspond to zero cost, a threshold difference and above may correspond to a max cost, and between the zero difference and the threshold difference the cost may be increase from zero cost to the max cost. The cost for each point of the current LiDAR elevation representation 614 may be averaged or otherwise weighted with each other point to determine the cost for the LiDAR elevation comparison.

In some examples, because the elevation values from the map data 208 may be determined relative to an origin 212 of a current road segment 214, and the elevation values from the current LiDAR elevation representation 614 may correspond to an origin 210 or reference point of the vehicle, a transform may be executed to compare the values from the LiDAR elevation representation 614 to the LiDAR elevation image from the map data 208. For example, where a point from the LiDAR elevation representation 614 has an elevation value of 1.0 meters (e.g., 1.0 meters up from an origin of the vehicle), a point of the map data 208 that corresponds to the point from the representation 614 has a value of 1.5 meters, and a difference in elevation between the origin 210 of the vehicle and the origin 212 of the road segment 214 of 0.5 meters (e.g., the origin 212 of the road segment is 0.5 meters higher than the origin 210 of the vehicle), the actual difference between the point from the map data 208 and the representation 614 may be 0.0 meters (e.g., 1.5 meters−0.5 meters=1 meter as the final value for the point from the map data 208 relative to the origin 210 of the vehicle). Depending on the example, the transform between the values of the map data 208 or the representation 614 may correspond to a transform from the road segment origin 212 to the vehicle origin 210, from the vehicle origin 210 to the road segment origin 212, or a combination thereof.

Figure 6C:
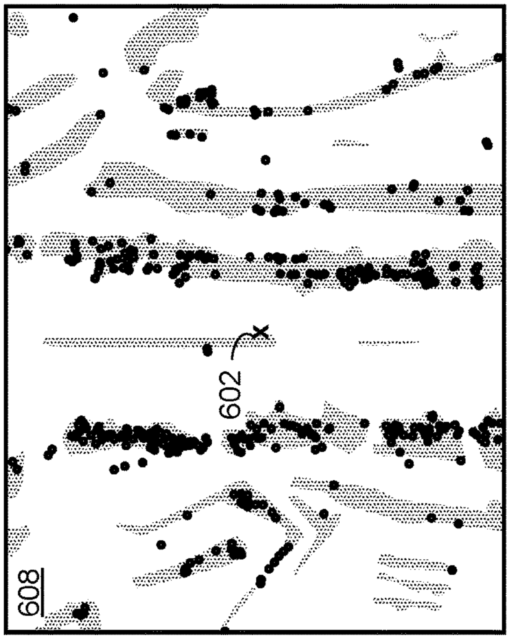
Figure 6D:
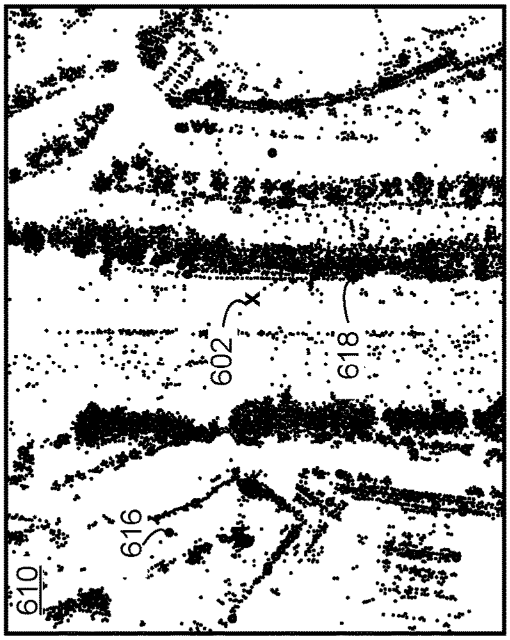

As a further example, with respect to FIGS. 6C-6D, a LiDAR layer of the fused HD map represented by the map data 208 may include a sliced LiDAR point cloud (e.g., corresponding to a ground plane slice, a giraffe plane slice, another defined slice, such as a one meter thick slice extending from two meters to three meters from the ground plane, etc.). In some examples, the point cloud may not be sliced and may instead represent an entirety of the point cloud. The sliced LiDAR point cloud (e.g., as illustrated in visualization 608) may be converted to a distance function representation of the same (e.g., as illustrated in visualization 610). For example, each point from the LiDAR point cloud may be converted such that a center of the point has zero cost and the cost increases the further from the center of the point until some max cost (e.g., as represented by the white regions of the visualization 610). In order to compute the cost for the current pose—e.g., represented by pose indicator—the LiDAR data from the sensor data 222 may be converted to a LiDAR point cloud (or a corresponding slice thereof) and compared against the distance function representation of the LiDAR point cloud (e.g., as represented in visualization 610). The hollow circles in the visualizations 608 and 610 may correspond to the current LiDAR point cloud predictions of the vehicle. As such, for each current LiDAR point, a cost may be determined by comparing each current LiDAR point to the distance function LiDAR values that the current LiDAR point corresponds to, or lands on. As such, a current LiDAR point 616 may have a max cost while a current LiDAR point 618 may have low cost—e.g., because the point 618 lands closely to a center of a point from the LiDAR point cloud in the map data 208. Ultimately, an average or other weighting of each of the costs from the current LiDAR points may be computed, and the final cost value may be used—in addition to the cost values from the elevation and intensity comparison—to update the cost space for the currently sampled pose.

In some examples, at least one of the LiDAR based cost space sampling 202, cost space aggregation 204, and/or filtering 306 may be executed on a GPU—e.g., a discrete GPU, a virtual GPU, etc.—and/or using one or more parallel processing units. For example, for camera-based cost spaces (e.g., described with respect to FIGS. 4A-4C), the detection information and the map data 208 projections may be stored as textures in memory on or accessible to the GPU, and the comparison may correspond to a texture lookup executed using the GPU. Similarly, with respect to LiDAR and/or RADAR, the comparison may correspond to a texture lookup. In addition, in some examples, parallel processing may be used to execute two or more cost spaces in parallel—e.g., a first cost space corresponding to LiDAR and a second cost space corresponding to RADAR may be generated in parallel using different GPU and/or parallel processing unit resources. For example, individual localizations 226 may be computed in parallel such that run time of the system for fused localization is reduced. As a result, these processes may be executed more efficiently than if executed on a CPU alone.

Referring again to FIG. 2A, after cost space sampling 202 is executed for a single frame or time step, and for any number of sensor modalities, cost space aggregation 204 may be executed. Cost space aggregation 204 may be executed separately for each sensor modality—e.g., a LiDAR based cost space aggregation, a RADAR based cost space aggregation, a camera based cost space aggregation, etc. For example, cost space aggregation 204 may aggregate the cost spaces computed for any number of frames (e.g., 25 frames, 80 frames, 100 frames, 300 frames, etc.). To aggregate the cost spaces, each prior cost space that has been computed may be ego-motion compensated to correspond to the current frame. For example, rotation and/or translation of the vehicle relative to the current pose of the vehicle and from each previous frame included in the aggregation may be determined, and used to carry forward the cost space values from the prior frames. In addition to transforming prior cost spaces based on ego-motion, the cost spaces may also be transformed such that each cost space corresponds to an origin 212 of a current road segment 214 of the fused HD map. For example, some number of the cost spaces to be aggregated may have been generated while the vehicle was localizing relative to a first road segment 214, and some other number of cost spaces to be aggregated may have been generated while the vehicle is localizing relative to a second road segment 214. As such, the cost spaces from the first or prior road segment 214 may be transformed such that the cost space values are relative to the second or current road segment 214. Once in the same reference frame corresponding to a current frame and a current road segment 214, the cost spaces may be aggregated. As a result, and with reference to FIG. 3B, the ego-motion of the vehicle over time may help disambiguate the individual cost spaces such that the aggregate cost space 310 may be generated.

The aggregate cost space 310 may then undergo filtering 306—e.g., using a Kalman filter or another filter type—to determine an ellipsoid 308 corresponding to a computed location of the vehicle with respect to the current road segment 214. Similar to the description above with respect to the transforms for the aggregate cost spaces 310, filtered cost space 310 may also undergo transforms to compensate for ego-motion and road segment switching. The ellipsoid 308 may indicate a current location relative to the current road segment 214 of the vehicle, and this process may be repeated at each new frame. The result may be individual localizations based on the sensor modality that the ellipsoid 308 was computed for, and multiple ellipsoids 308 may be computed at each frame—e.g., one for each sensor modality.

Figure 7:
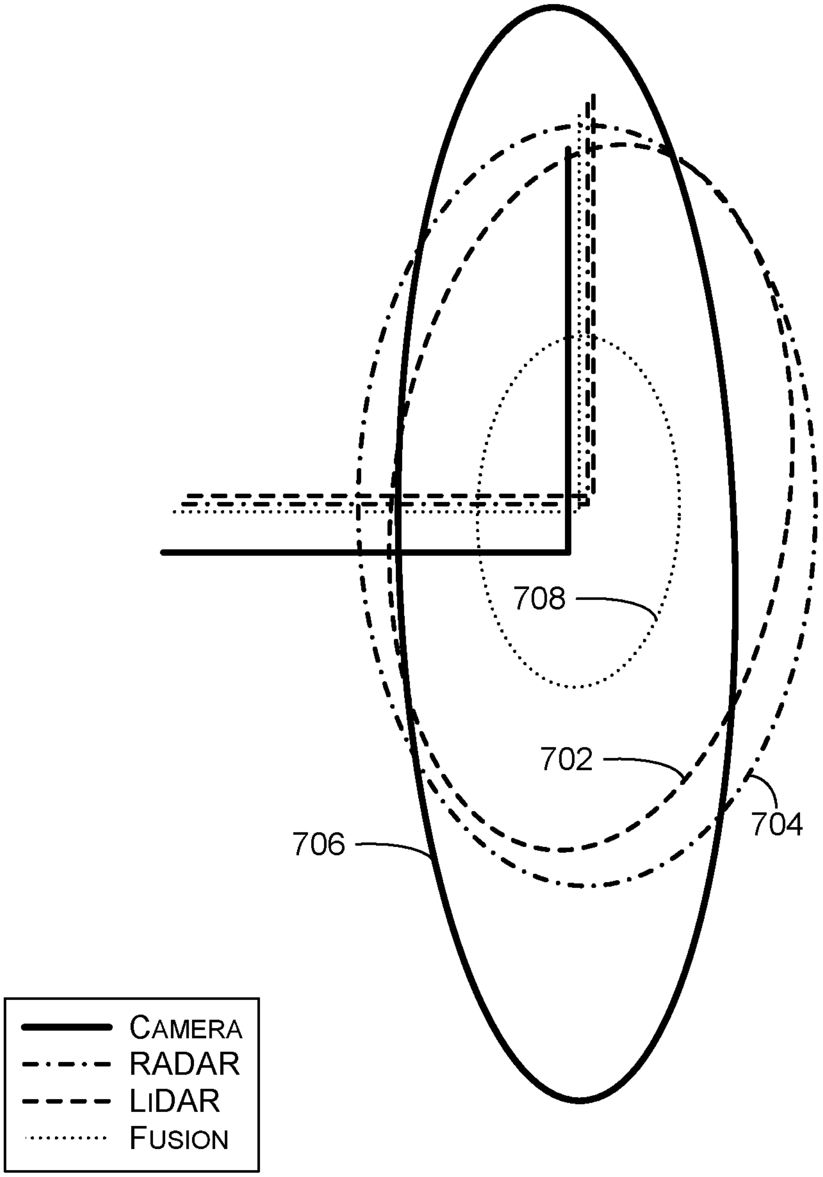
FIG. 7 illustrates an example of fusing a plurality of localization results to generate a final localization result, in accordance with some embodiments of the present disclosure.

Localization fusion 220 may then be executed on the individual localizations 226 to generate a final localization result. For example, with reference to FIG. 7, the individual localizations 226 may correspond to a LiDAR based localization 702 (e.g., represented by an ellipsoid and an origin in visualization 1300), a RADAR based localization 704, a camera based localization 706, other sensor modality localizations (not shown), and/or a fused localization 708. Although only a single localization per sensor modality is described herein, this is not intended to be limiting. In some examples, there may be more than one localization result for different sensor modalities. For example, a vehicle may be localized with respect to a first camera (e.g., a forward facing camera) and may separately be localized with respect to a second camera (e.g., a rearward facing camera). In such an example, the individual localizations 226 may include a first camera based localization and a second camera based localization. In some embodiments, the fused localization 708 may correspond to the fusion of the individual localizations 226 at the current frame and/or may correspond to a prior fused localization result(s) from one or more prior frames carried forward—e.g., based on ego-motion—to the current frame. As such, the fused localization 708 for a current frame may take into account individual localizations 226 and prior fused localization results, in embodiments, to advance a current localization state through frames.

To compute the fused localization 708 for a current frame, an agreement/disagreement analysis may be executed on the individual localizations 226. For example, in some embodiments, a distance threshold may be used to determine clusters of individual localizations 226, and the cluster with the least inner-cluster covariance may be selected for fusion. The individual localizations 226 within the selected cluster may then be averaged or otherwise weighted to determine the fused localization 708 for the current frame. In some embodiments, a filter—such as a Kalman filter—may be used to generate the fused localization 708 of the clustered individual localizations 226 for a current frame. For example, a Kalman filter, where employed, may not deal with outliers well, so a heavy outlier may have an undesirable impact on the final result. As such, the clustering approach may aid in filtering out or removing the outliers such that the Kalman filter based fusion is more accurate. In some examples, such as where a prior fusion result is carried forward to a current frame as an individual localization 226, the fusion result from a prior frame may drift. For example, once the current individual localizations 226 are different enough from the fusion result (e.g., where the fusion result may be filtered out of the cluster), the fusion result may be re-initialized for the current frame, and the re-initialized fusion result may then be carried forward to subsequent frames until a certain amount of drift is again detected.

In some examples, the fused localization 708 may be determined by factoring in each of the individual localizations 226. For example, instead of grouping the results into clusters, each individual localization 226 may be weighted based on a distance evaluation. For example, covariance may be computed for the individual localizations 226, and the individual localizations 226 with the highest covariance (e.g., corresponding to the greatest outliers) may be weighted less for determining the fused localization 708. This may be executed using a robustified mean such that outliers do not have an undesirable impact on the fused localization 708. For example, a distance for each individual localization 226 to the robustified mean may be computed, and the greater the distance the less weight the individual localization 226 may have in determining the fused localization 708.

The fused localization 708 for the current frame may then be used to localize the vehicle with respect to the road segment 214 of the fused HD map (represented by the map data 208) and/or with respect to the global coordinate system. For example, because the road segment 214 may have a known global location, the localization of the vehicle to the road segment 214 may have a corresponding global localization result. In addition, because the local or relative localization to the road segment 214 is more accurate than a global or GNSS localization result alone, the planning and control for the vehicle may be more reliable and safer than in solely GNSS based localization systems.

Referring back to the example of FIG. 1, the process 100 may include the localization component 102 generating and/or outputting pose data 108 and processing data 110. The pose data 108 may represent the estimated pose (also referred to as a "localization pose") determined by the localization component 102 based at least on performing one or more of the processes described herein. As described herein, the estimated pose may represent a location (e.g., a x-coordinate location, a y-coordinate location, and/or a z-coordinate location) of the vehicle, an orientation (e.g., a yaw, a pitch, and/or a roll) of the vehicle, and/or any other location information. The processing data 110 may represent information associated with at least part of the processing performed by the localization component 102 when determining the estimated pose. For example, the processing data 110 may represent one or more correspondences between one or more features represented by the sensor data 104 and one or more features represented by the map data 106. As described herein, a correspondence may indicate whether a feature represented by the sensor data 104 matches a feature represented by the map data 106, whether a location of a feature as represented by the sensor data 104 matches a location of the same feature as represented by the map data 106, a cost associated with a feature represented by the sensor data 104 matching a feature represented by the map data 106, a cost associated with a pose that is based on the feature matching, and/or any other relationships that are based at least on the feature matching.

As described herein, in some examples, the localization performed by the localization component 102 to determine the estimated pose may include one or more errors based at least on one or more factors. A factor may include, but is not limited to, the sensor data 104 not representing an adequate number of features, the sensor data 104 being obstructed, the map being incomplete for the environment for which the vehicle is navigating, problems (e.g., noise) with the processing, and/or so forth. Additionally, in some examples, the error(s) may include a first error in a first coordinate direction (e.g., the x-coordinate direction) between the estimated pose and an actual pose of the vehicle, a second error in a second coordinate direction (e.g., the y-coordinate direction) between the estimated pose and the actual pose of the vehicle, a third error in a third coordinate direction (e.g., the z-coordinate direction) between the estimated pose and the actual pose of the vehicle, a fourth error in a yaw difference between the estimated pose and the actual pose of the vehicle, a fifth error in a roll difference between the estimated pose and the actual pose of the vehicle, a sixth error in a pitch difference between the estimated pose and the actual pose of the vehicle, and/or so forth.

Figure 8:
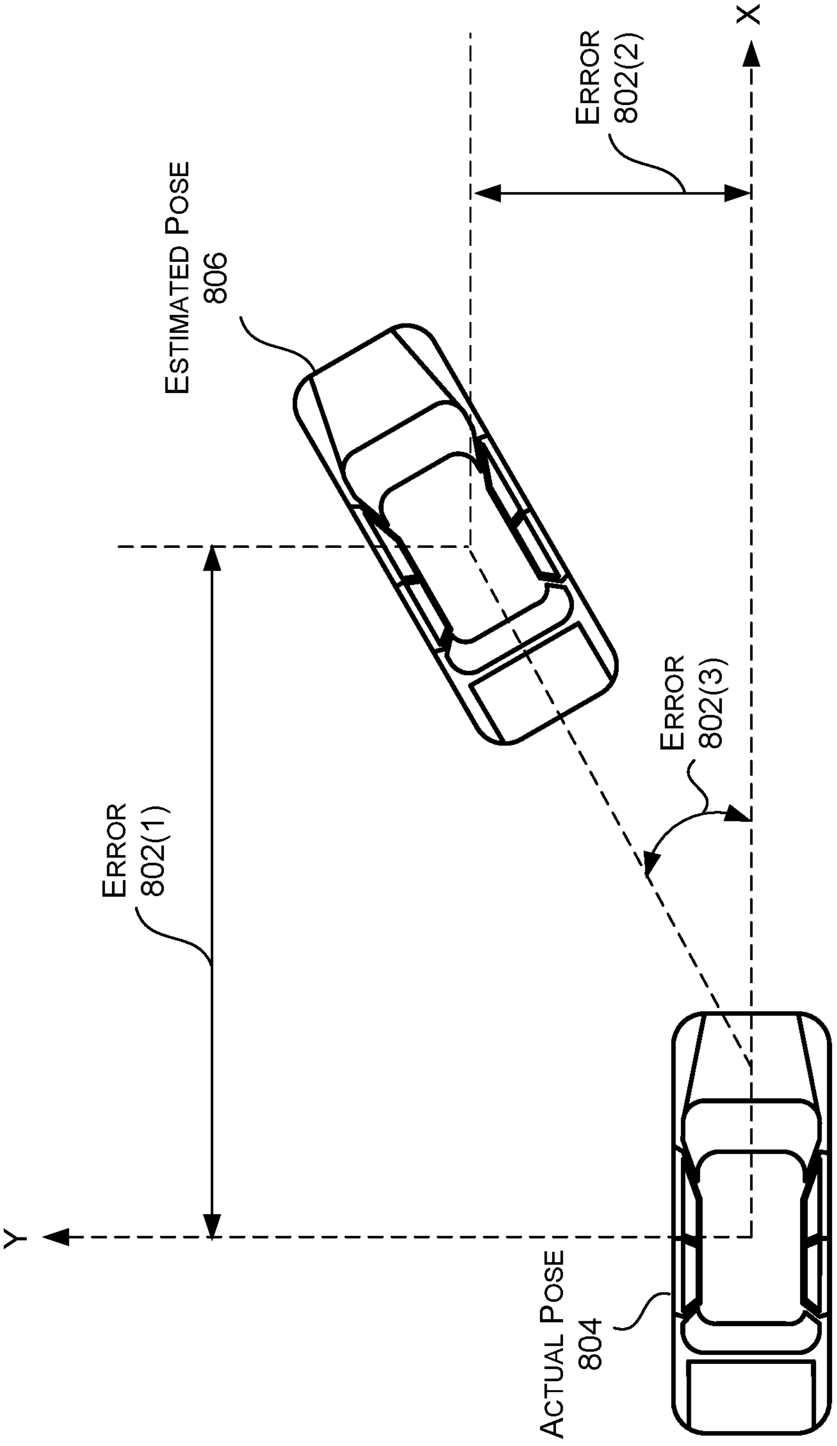
FIG. 8 illustrates an example of one or more errors between an actual pose associated with a vehicle and a localization pose associated with the vehicle, in accordance with some embodiments of the present disclosure.

For instance, FIG. 8 illustrates an example of errors 802(1)-(3) (also referred to singularly as "error 802" or in plural as "errors 802") between an actual pose 804 associated with a vehicle and an estimated pose 806 (e.g., a localization pose) associated with the vehicle, in accordance with some embodiments of the present disclosure. As shown by the example of FIG. 8, the errors 802 may include at least the first error 802(1) associated with a distance in a first direction (e.g., the x-direction), the second error 802(2) associated with a distance in a second direction (e.g., the y-direction), and the third error 802(3) associated with a yaw angle. However, in other examples, the errors 802 may further include an error associated with a distance in a third direction (e.g., the z-direction), an error associated with pitch, an error associated with roll, and/or any other error.

Referring back to the example of FIG. 1, the process 100 may include using an error component 112 to determine the error(s) associated with the estimated pose and/or one or more uncertainties associated with the error(s). To determine the error(s), the error component 112 may use various types of information, such as information associated with a motion of the vehicle, information associated with the localization processing, information associated with one or more previous errors of one or more previous estimated poses, and/or the like.

For instance, and with regard to the information associated with the motion of the vehicle, the error component 112 may use a previous pose associated with the vehicle along with a portion of the sensor data 104 (also referred to as "motion data") generated using one or more motion sensors (e.g., one or more inertial measurement unit (IMU) sensors, etc.) to determine a true pose associated with the vehicle. In some examples, the pose may be considered a "true" pose based on the assumption that the motion data is accurate and/or substantially accurate, at least for short time periods and/or short distances of travel associated with the vehicle. In some examples, the true pose may include and/or correspond to the actual pose of the vehicle. The error component 112 may then determine one or more differences between the true pose and the estimated pose, such as one or more location differences (e.g., differences in the x-coordinate direction, the y-coordinate direction, and/or the z-coordinate location) and/or one or more orientation differences (e.g., differences in the yaw, the pitch, and/or the roll). In some examples, the localization component 102 may determine one or more errors (referred to, in some examples, as a "first error(s)") using the difference(s).

Figure 9:
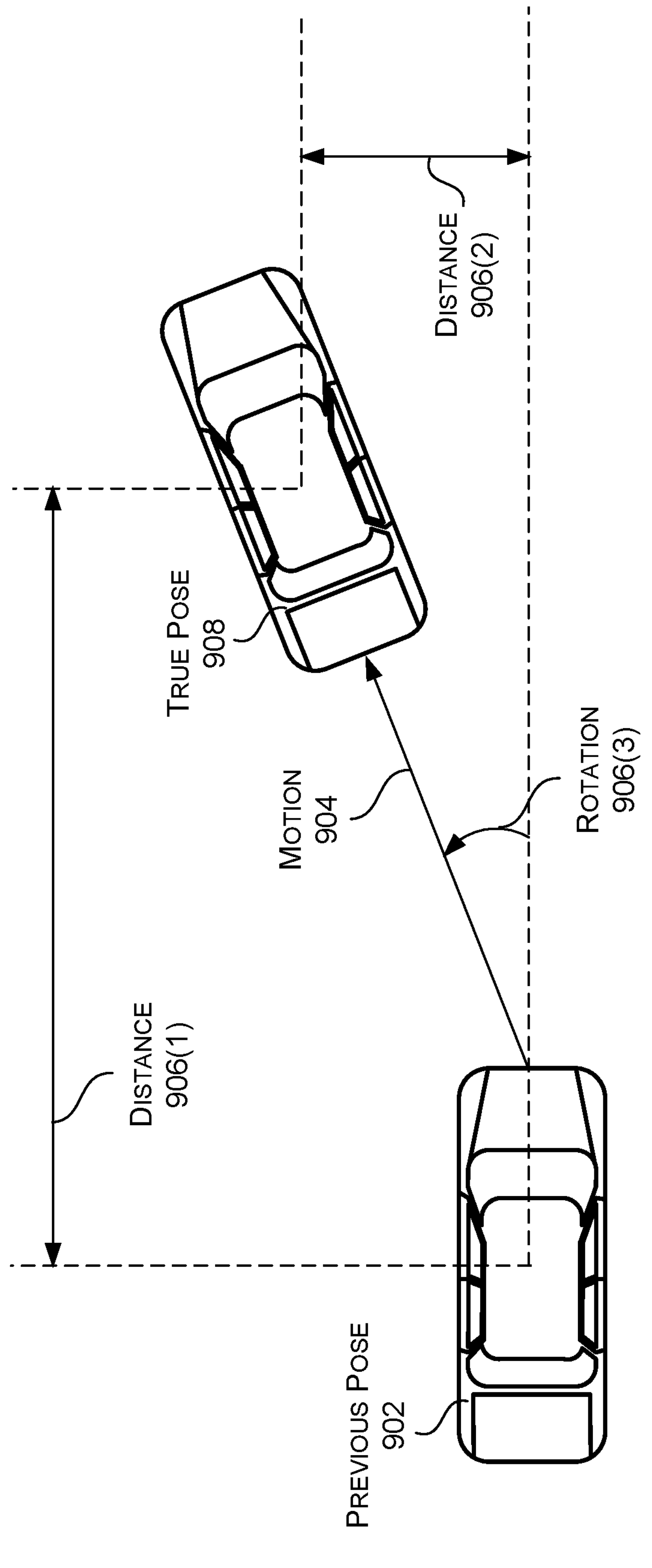
FIG. 9 illustrates an example of using motion associated with a vehicle to determine a true pose associated with the vehicle, in accordance with some embodiments of the present disclosure.

For instance, FIG. 9 illustrates an example of using motion associated with a vehicle to determine a true pose associated with the vehicle, in accordance with some embodiments of the present disclosure. As shown, the error component 112 may initially determine a previous pose 902 associated with the vehicle. In some examples, the previous pose 902 may correspond to an estimated pose of the vehicle determined by the localization component 102 during a previous instance of localizing the vehicle and/or an estimated pose of the vehicle for which the error component 112 determine one or more errors. The error component 112 may then determine a motion 904 of the vehicle between a time associated with the previous pose 902 and a current time. As shown, in some examples, the motion 904 may be associated with at least a distance 906(1) in a first direction (e.g., the x-direction), a distance 906(2) in a second direction (e.g., the y-direction), and a change in orientation 906(3) (e.g., a change in a yaw angle). However, in other examples, the motion 904 may be associated with one or more distances in one or more additional directions (e.g., the z-direction) and/or one or more additional orientation changes (e.g., a change in pitch, a change in roll, etc.).

The error component 112 may then use the previous pose 902 associated with the vehicle and the motion 904 associated with the vehicle to determine a true pose 908 associated with the vehicle. For example, the error component 112 may determine the true pose 908 by updating the current pose 902 based at least on the motion 904.

Figure 10:
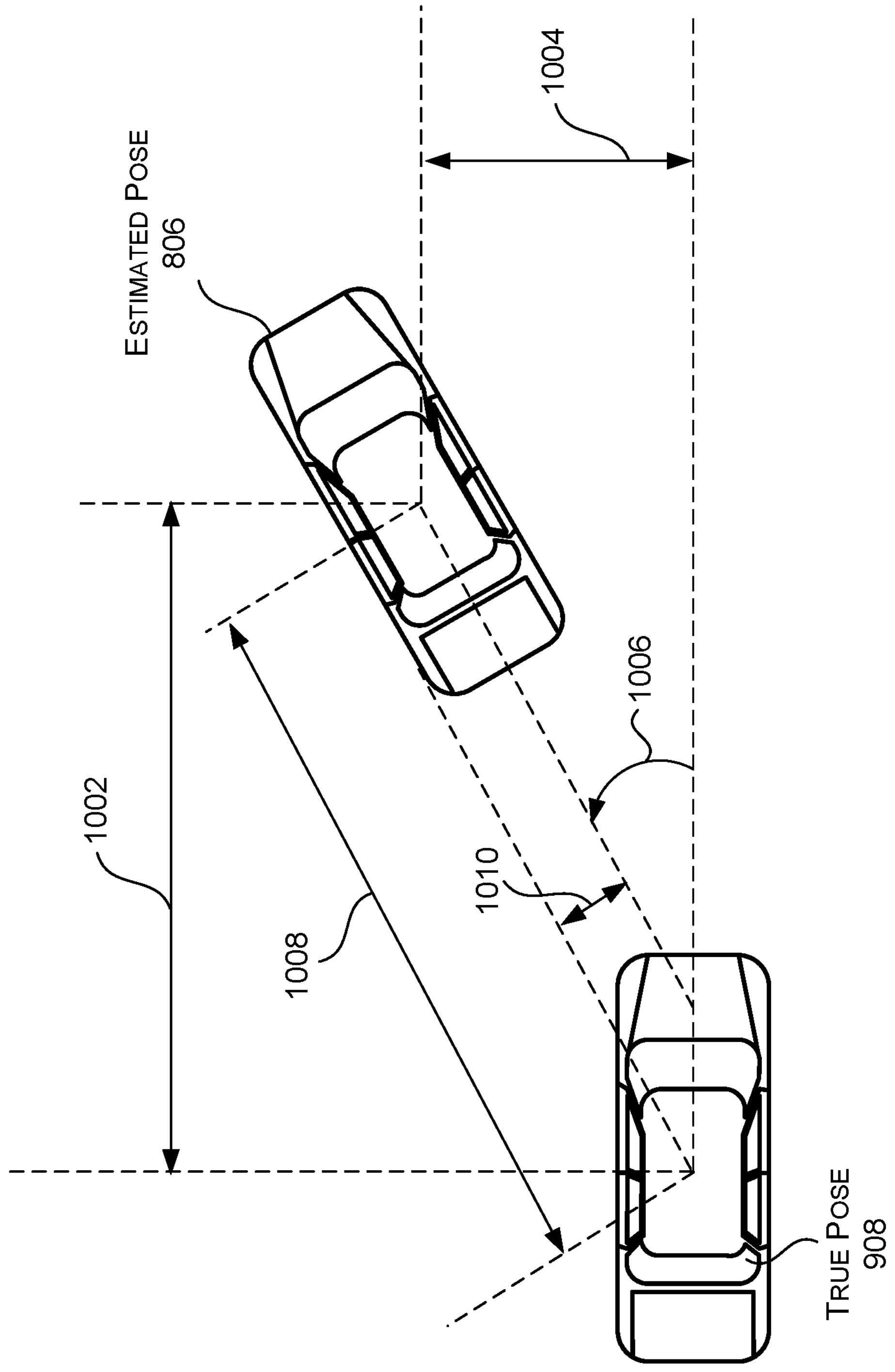
FIG. 10 illustrates an example of determining one or more errors associated with a motion of a vehicle, in accordance with some embodiments of the present disclosure.

FIG. 10 illustrates an example of determining one or more errors associated with the motion of the vehicle, in accordance with some embodiments of the present disclosure. For instance, the error component 112 may determine the error (s) associated with the motion using the following equations:

$$\begin{bmatrix} \epsilon_{x_k} \\ \epsilon_{y_k} \\ \epsilon_{\theta_k} \end{bmatrix}_{TP_k}^{LP_{\bar{k}}} = \begin{bmatrix} -1 & 0 & 0 \\ 0 & -1 & 0 \\ 0 & 0 & -1 \end{bmatrix} \begin{bmatrix} \cos(opt_\theta) & \sin(opt_\theta) & 0 \\ -\sin(opt_\theta) & \cos(opt_\theta) & 0 \\ 0 & 0 & 1 \end{bmatrix} \begin{bmatrix} opt_x \\ opt_y \\ opt_\theta \end{bmatrix}_{LP_{\bar{k}}} \tag{1}$$

$$\begin{bmatrix} opt_x \\ opt_y \\ opt_\theta \end{bmatrix}_{LP_{\bar{k}}} = \begin{bmatrix} -\cos(opt_\theta) & \sin(opt_\theta) & 0 \\ -\sin(opt_\theta) & -\cos(opt_\theta) & 0 \\ 0 & 0 & -1 \end{bmatrix} \begin{bmatrix} \epsilon_{x_k} \\ \epsilon_{y_k} \\ \epsilon_{\theta_k} \end{bmatrix}_{TP_k}^{LP_{\bar{k}}} \tag{2}$$

In equations (1)-(2), TP is the true pose 908, LP is the estimated pose 806 (e.g., the localization pose) $\epsilon_{x_k}$ is 1002, $\epsilon_{y_k}$ is 1004, $\epsilon_{\theta_k}$ is 1006, $opt_x$ is 1008, $opt_y$ is 1010, and $opt_\theta$ is also 1006. As such, the errors determined by the error component 112 may include at least $\epsilon_{x_k}$ 1002, $\epsilon_{y_k}$ 1004, and $\epsilon_{\theta_k}$ 1006.

Figure 11:
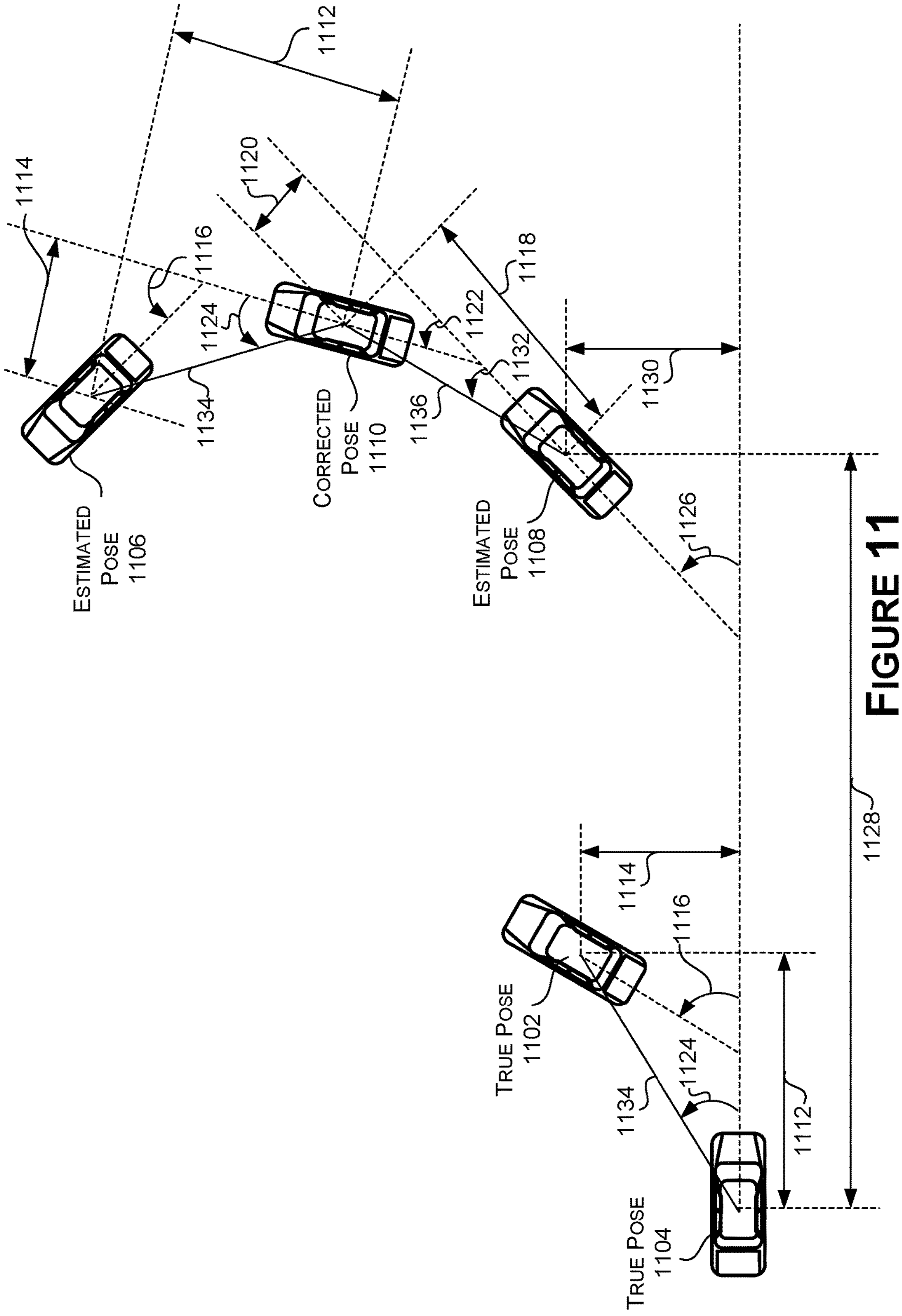
FIG. 11 illustrates an example of determining one or more errors associated with motion of a vehicle using both a relative motion of the vehicle and a localization correction, in accordance with some embodiments of the present disclosure.

FIG. 11 illustrates an example of determining one or more errors associated with the motion of the vehicle using both a relative motion of the vehicle and a localization correction, in accordance with some embodiments of the present disclosure. As shown, FIG. 11 illustrates a true pose 1102 of the vehicle at a current time (e.g., the true pose 908), a true pose 1104 of the vehicle at a previous time, an estimated pose 1106 (e.g., a localization pose) of the vehicle at the current time (e.g., the estimated pose 806), an estimated pose 1108 (e.g., a previous localization pose) of the vehicle at the previous time, and a corrected pose 1110 of the vehicle at the previous time. Additionally, the true pose 1102 may be determined by adding a relative motion to the true pose 1104, where the relative motion includes $d_{x_k}$ 1112, $d_{y_k}$ 1114, and $\alpha_k$ 1116. The estimated pose 1106 may be determined by adding the relative motion to the corrected pose 1110. Additionally, the corrected pose 1110 may be determined by adding a localization correction to the estimated pose 1108, where the localization correction includes $l_{x_{k-1}}$ 1118, $l_{y_{k-1}}$ 1120, and $\beta_{k-1}$ 1122.

FIG. 11 further illustrates additional variables associated with the poses, such as $\theta_k$ 1124, $\epsilon_{\theta_{k-1}}$ 1126, $\epsilon_{x_{k-1}}$ 1128, $\epsilon_{y_{k-1}}$ 1130, $\gamma_{k-1}$ 1132, $d_k$ 1134, and $l_{k-1}$ 1136. As such, the error component 112 may determine errors, such as an error $\epsilon_{\bar{x}_k}$ in the x-coordinate direction, an error $\epsilon_{\bar{y}_k}$ in the y-coordinate direction, and an error $\epsilon_{\bar{\theta}_k}$ associated with yaw using the following equations (which may use a Kalman filter framework):

$$\begin{bmatrix} \epsilon^-_{x_k} \\ \epsilon^-_{y_k} \\ \epsilon^-_{\theta_k} \end{bmatrix}_{TP_k}^{LP_{\bar{k}}} = \begin{bmatrix} \cos(\alpha_k) & \sin(\alpha_k) & \begin{matrix} l_{x_{k-1}}\sin(\alpha_k) - l_{y_{k-1}}\cos(\alpha_k) + \\ d_{x_k}\sin(\alpha_k - \beta_{k-1}) - d_{y_k}\cos(\alpha_k - \beta_{k-1}) \end{matrix} \\ -\sin(\alpha_k) & \cos(\alpha_k) & \begin{matrix} l_{x_{k-1}}\cos(\alpha_k) - l_{y_{k-1}}\sin(\alpha_k) + \\ d_{x_k}\cos(\alpha_k - \beta_{k-1}) - d_{y_k}\sin(\alpha_k - \beta_{k-1}) \end{matrix} \\ 0 & 0 & 1 \end{bmatrix} \begin{bmatrix} \epsilon_{x_{k-1}} \\ \epsilon_{y_{k-1}} \\ \epsilon_{\theta_{k-1}} \end{bmatrix}_{TP_{k-1}}^{LP_{\bar{k}-1}} + \begin{bmatrix} \cos(\alpha_k) & \sin(\alpha_k) & 0 \\ -\sin(\alpha_k) & \cos(\alpha_k) & 0 \\ 0 & 0 & 1 \end{bmatrix} \begin{bmatrix} l_{x_{k-1}} - d_{y_k}\sin(\beta_{k-1}) \\ l_{y_{k-1}} - d_{x_k}\sin(\beta_{k-1}) \\ \beta_{k-1} \end{bmatrix} \tag{3}$$

$$\begin{bmatrix} \epsilon^-_{x_k} \\ \epsilon^-_{y_k} \\ \epsilon^-_{\theta_k} \end{bmatrix}_{TP_k}^{LP_{\bar{k}}} \approx \begin{bmatrix} \cos(\alpha_k) & \sin(\alpha_k) & -\left(d_{y_k} + l_{y_{k-1}}\right) \\ -\sin(\alpha_k) & \cos(\alpha_k) & \left(d_{x_k} + l_{x_{k-1}}\right) \\ 0 & 0 & 1 \end{bmatrix} \begin{bmatrix} \epsilon_{x_{k-1}} \\ \epsilon_{y_{k-1}} \\ \epsilon_{\theta_{k-1}} \end{bmatrix}_{TP_{k-1}}^{LP_{\bar{k}-1}} + \begin{bmatrix} \cos(\alpha_k) & \sin(\alpha_k) & -d_{y_k} \\ -\sin(\alpha_k) & \cos(\alpha_k) & d_{x_k} \\ 0 & 0 & 1 \end{bmatrix} \begin{bmatrix} l_{x_{k-1}} \\ l_{y_{k-1}} \\ \beta_{k-1} \end{bmatrix} \tag{4}$$

Referring back to the example of FIG. 1, and with regard to the localization processing, the error component 112 may compare one or more features represented by the sensor data 104 to one or more features represented by the map data 106. Based at least on the comparing, the error component 112 may determine one or more correspondences between the feature(s) represented by the sensor data 104 and the feature(s) represented by the map data 106. In some examples, the error component 112 performs the comparison and/or determines the correspondence(s) using one or more similar techniques as those used by the localization component 102 when performing the localization, which is described above. In some examples, a correspondence may indicate whether a feature represented by the sensor data 104 matches a feature represented by the map data 106, whether a location of a feature as represented by the sensor data 104 matches a location of the same feature as represented by the map data 106, a cost associated with a feature represented by the sensor data 104 matching a feature represented by the map data 106, a cost associated with a pose that is based on the feature matching, and/or any other relationships that are based at least on the feature matching. Still, in some examples, the error component 112 may determine one or more errors (referred to, in some examples, as a "second error(s)") using the correspondence(s).

The error component 112 may then determine the final error(s) associated with the localization based at least on the difference(s) (e.g., the first error(s)) between the true pose and the estimated pose (e.g., the information associated with the motion of the vehicle), the correspondence(s) (e.g., the second error(s)) between the feature(s) represented by the sensor data 104 and the feature(s) represented by the map data 106 (e.g., the information associated with the localization), a previous error(s) associated with one or more previous localizations of the vehicle, and/or any other additional information. In some examples, the error component 112 uses one or more algorithms, such as an algorithm associated with a Kalman filter framework, that fuse the first error(s) associated with the difference(s) between the true pose and the estimated pose and the second error(s) that is directly observed from the measurements when comparing the feature(s) represented by the sensor data 104 to the feature(s) represented by the map data 106 to determine the final error(s). Additionally, in some examples, the error component 112 may use similar techniques and/or algorithms to determine an uncertainty associated with the final error(s).

The process 100 may include the error component 112 outputting error data 114 representing the first error(s) associated with the vehicle motion, the second error(s) associated with the comparison of the sensor data 104 to the map data 106, and/or the final error(s) associated with the localization. In some examples, the process 100 may further include outputting uncertainty data 116 representing the one or more uncertainties associated with the final error(s). Additionally, the process 100 may continue to repeat as the vehicle continues to navigate around the environment such that the localization component 102 continues to localize the vehicle within the environment and the error component 112 continues to determine new errors associated with the new localization determinations. In some examples, the process 100 may then include using the error data 114 and/or the uncertainty data 116 to perform one or more processes.

For example, the process 100 may include a mode component 118 determining whether the final error(s) satisfies (e.g., is less than or equal to) one or more error thresholds (e.g., one or more error bounds), where the error threshold(s) is represented by threshold data 120. In some examples, different errors may include different error thresholds. For example, a first error associated with the x-coordinate distance may be associated with a first error threshold (e.g., a first distance threshold), a second error associated with the y-coordinate distance may be associated with a second error threshold (e.g., a second distance threshold), a third error associated with the z-coordinate distance may be associated with a third error threshold (e.g., a third distance threshold), a fourth error associated with the yaw may be associated with a fourth error threshold, a fifth error associated with the pitch may be associated with a fifth error threshold, and/or a sixth error associated with the roll may be associated with a sixth error threshold. In such examples, the mode component 118 may compare one or more final errors (e.g., each of the final errors) to the respective error threshold.

In some examples, the mode component 118 may cause the vehicle to operate in a first mode when at least one of the final error(s) does not satisfy a respective error threshold and/or a second mode when all of the final error(s) satisfy a respective error threshold. For example, if the first error does not satisfy (e.g., is greater than) the first error threshold, but the other errors satisfy (e.g., are less than or equal to) their respective error thresholds, then the mode component 118 may cause the vehicle to operate in the first mode. However, if the mode component 118 determines that all of the final errors satisfy (e.g., are less than or equal to) their respective error thresholds, then the mode component 118 may cause the vehicle to operate in the second mode. However, in some examples, the mode component 118 may cause the vehicle to operate in the first mode when two or more of the final errors do not satisfy their respective error thresholds.

As described herein, in some examples, when operating in the first mode, the vehicle may perform one or more first processes, such as outputting the estimated pose (e.g., the localization pose) to a user, causing one or more other systems of the vehicle to use the estimated pose (e.g., for navigating the vehicle), and/or any other operation. Additionally, when operating in the second mode, the vehicle may perform one or more second processes, such as not outputting the estimated pose to the user, causing the one or more other systems to refrain from using the estimated pose, and/or any other operation. In such examples, the vehicle may perform such processes since the vehicle may trust the estimated pose when the final error(s) associated with the estimated pose is small, but not trust the estimated pose when the final error(s) associated with the estimated pose is large.

Figure 12A:
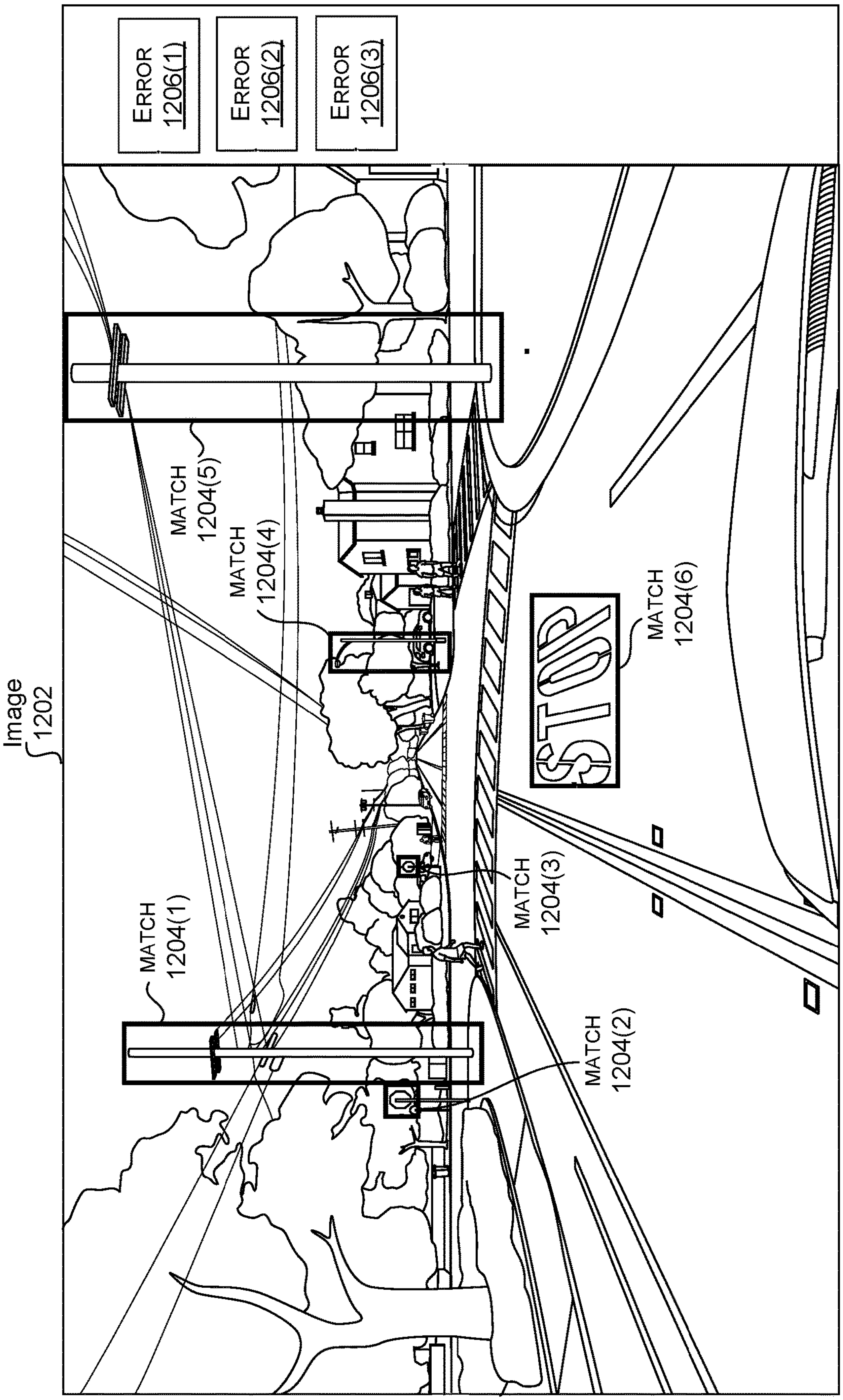
FIG. 12A-12B illustrate examples of determining errors associated with localization of a vehicle, in accordance with some embodiments of the present disclosure.
Figure 12B:
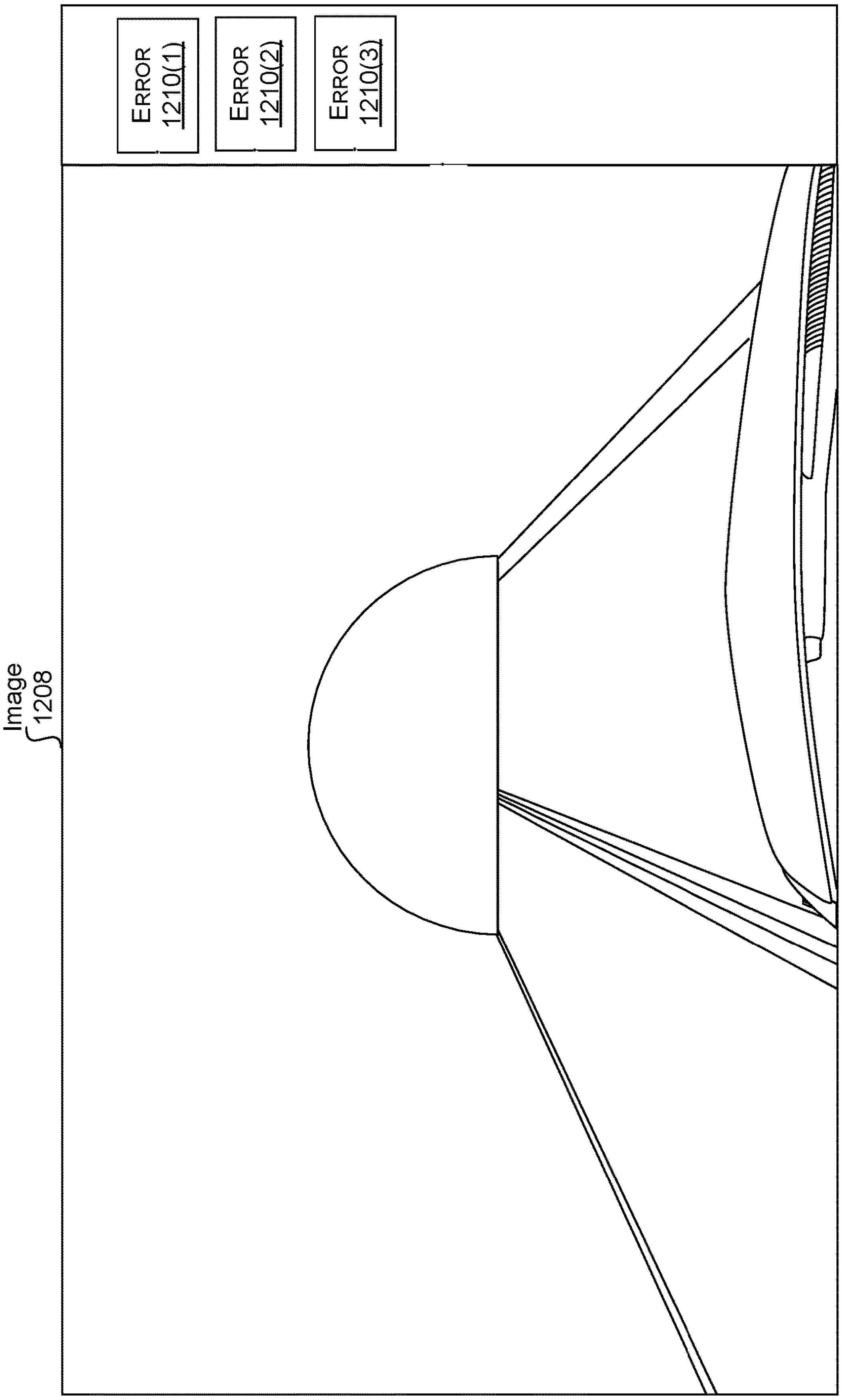

FIG. 12A-12B illustrate examples of determining errors associated with localization of a vehicle, in accordance with some embodiments of the present disclosure. For instance, and in the example of FIG. 12A, the localization component 102 and/or the error component 112 may process sensor data (e.g., the sensor data 104) representing an image 1202. Based at least on the processing, the localization component 102 and/or the error component 112 may identify multiple matches 1204(1)-(6) (also referred to singularly as "match 1204" or in plural as "matches 1204") between features represented by the sensor data and features represented by map data (e.g., the map data 106). For example, the localization component 102 and/or the error component 112 may determine the first match 1204(1) associated with an electrical pole, the second match 1204(2) associated with a stop sign, the third match 1204(3) associated with another stop sign, the fourth match 1204(4) associated with a streetlight, the fifth match 1204(5) associated with another electrical pole, and the sixth match 1204(6) associated with a road marking.

Based at least on the number of matches 1204, the localization component 102 may determine an accurate estimated pose associated with the vehicle. As such, and based at least on the number of matches 1204 as well as the estimated pose being accurate, the error component 112 may determine that at least a first error 1206(1) associated with a distance in the x-coordinate direction, a second error 1206(2) associated with a distance in the y-coordinate direction, and/or a third error 1206(3) associated with a yaw may be small. As such, the vehicle may operate in the second mode described above.

In the example of FIG. 12B, the localization component 102 and/or the error component 112 may process sensor data (e.g., the sensor data 104) representing an image 1208. Based at least on the processing, the localization component 102 and/or the error component 112 may not identify any features represented by the sensor data that match any features represented by the map data (e.g., the map data 106). In some examples, the localization component 102 and/or the error component 112 may not identify any matches based on the vehicle navigating within an environment that does not include any and/or few map features, such as within a tunnel. As such, the localization component 102 may determine an estimated pose associated with the vehicle that is not as accurate as the estimated pose from the example of FIG. 12A. Additionally, and based at least on the number of matches as well as the estimated pose not being as accurate, the error component 112 may determine at least a first error 1210(1) associated with a distance in the x-coordinate direction, a second error 1210(2) associated with a distance in the y-coordinate direction, and/or a third error 1210(3) associated with a yaw that are larger than the errors 1206(1)-(3) from the example of FIG. 12A. As such, the vehicle may operate in the first mode described above.

Figure 13:
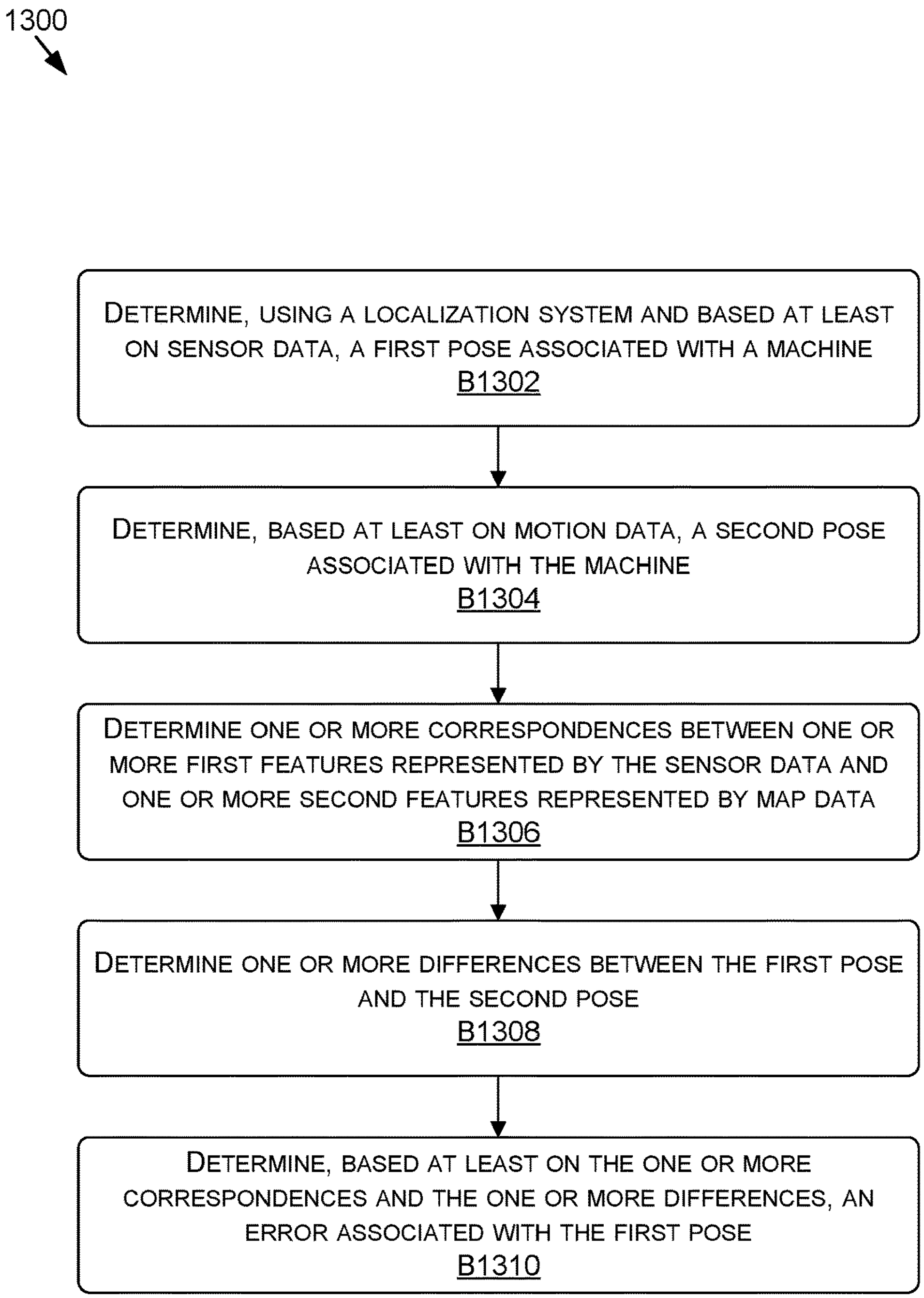
FIG. 13 illustrates a flow diagram showing a method for determining one or more errors associated with localization, in accordance with some embodiments of the present disclosure.
Figure 14:
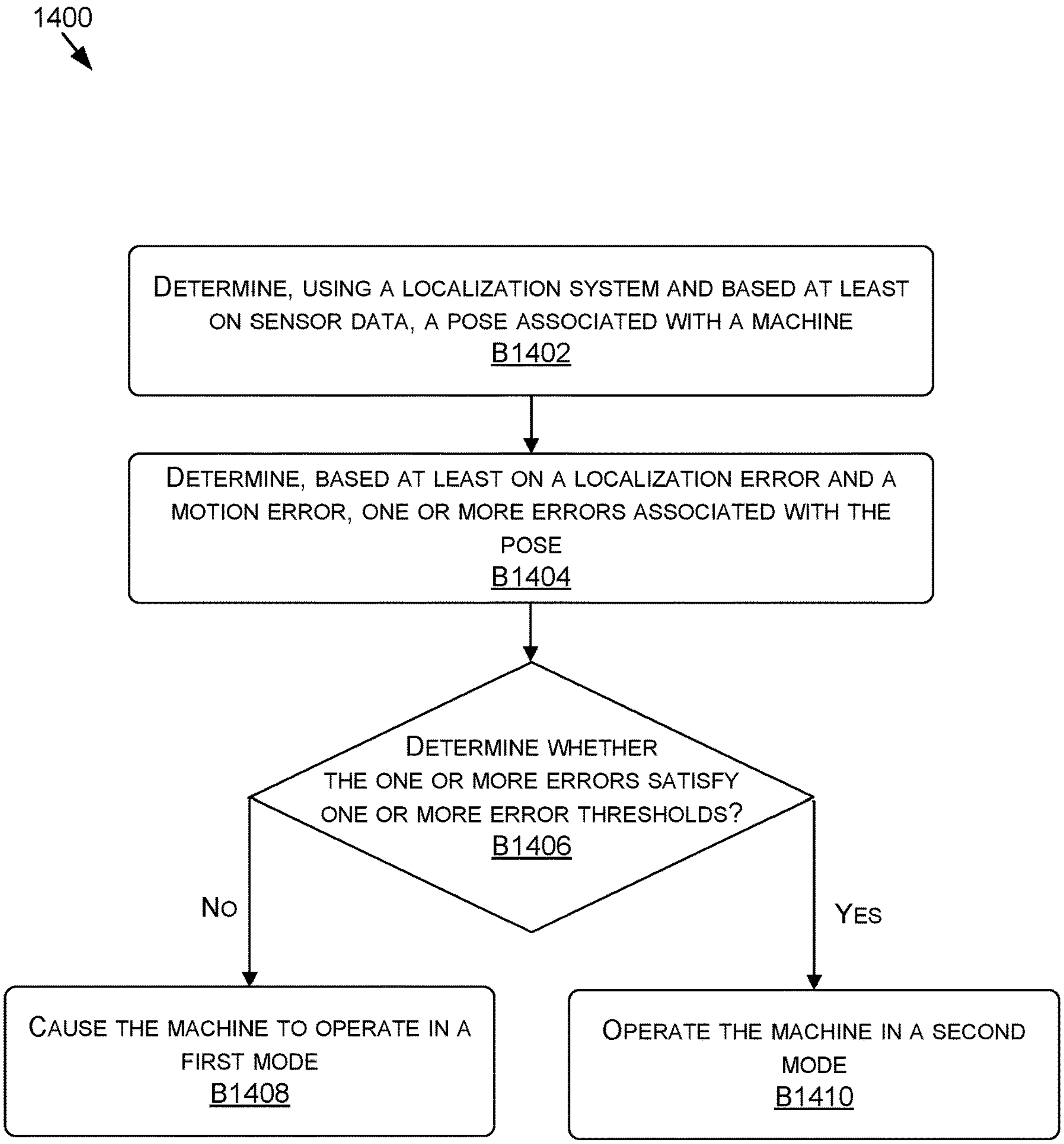
FIG. 14 illustrates a flow diagram showing a method for determining a mode of operation based at least on one or more errors associated with localization, in accordance with some embodiments of the present disclosure.

Now referring to FIGS. 13-14, each block of methods 1300 and 1400, described herein, comprises a computing process that may be performed using any combination of hardware, firmware, and/or software. For instance, various functions may be carried out by a processor executing instructions stored in memory. The methods 1300 and 1400 may also be embodied as computer-usable instructions stored on computer storage media. The methods 1300 and 1400 may be provided by a standalone application, a service or hosted service (standalone or in combination with another hosted service), or a plug-in to another product, to name a few. In addition, the method 1300 and 1400 are described, by way of example, with respect to FIG. 1. However, these methods 1300 and 1400 may additionally or alternatively be executed by any one system, or any combination of systems, including, but not limited to, those described herein.

FIG. 13 illustrates a flow diagram showing a method 1300 for determining one or more errors associated with localization, in accordance with some embodiments of the present disclosure. The method 1300, at block B1302, may include determining, using a localization system and based at least on sensor data, a first pose associated with a machine. For instance, the localization component 102 may use at least a portion of the sensor data 104, such as the sensor data 104 generated using one or more location sensors (e.g., a GPS), to determine an initial pose associated with the machine. The localization component 102 may then use at least another portion of the sensor data 104 and the map data 106 to refine the initial pose in order to determine the first pose (e.g., an estimated pose, a localization pose, etc.). In some examples, and as described herein, the localization component 102 refines the initial pose using at least feature matching.

The method 1300, at block B1304, may include determining, based at least on motion data, a second pose associated with the machine. For instance, the error component 112 may use the motion data to determine motion of the machine, such as distances traveled in one or more directions and/or orientation changes. The error component 112 may then determine the second pose (e.g., a true pose, etc.) by moving the machine within the environment from a previous pose based on the motion.

The method 1300, at block B1306, may include determining one or more correspondences between one or more first features represented by the sensor data and one or more second correspondences represented by map data. For instance, the error component 112 may compare the first feature(s) represented by the sensor data 104 to the second feature(s) represented by the map data 106 to determine the correspondence(s). As described herein, a correspondence may indicate whether a feature represented by the sensor data 104 matches a feature represented by the map data 106, whether a location of a feature as represented by the sensor data 104 matches a location of the same feature as represented by the map data 106, a cost associated with a feature represented by the sensor data 104 matching a feature represented by the map data 106, a cost associated with a pose that is based on the feature matching, and/or any other relationships that are based at least on the feature matching.

The method 1300, at block B1308, may include determining one or more differences between the first pose and the second pose. For instance, the error component 112 may determine the difference(s) between the first pose and the second pose. As described herein, in some examples, the difference(s) may include one or more location differences (e.g., differences in the x-coordinate direction, the y-coordinate direction, and/or the z-coordinate location) and/or one or more orientation differences (e.g., differences in the yaw, the pitch, and/or the roll).

The method 1300, at block B1310, may include determining, based at least on the one or more correspondences and the one or more differences, an error associated with the first pose. For instance, the error component 112 may determine the error associated with the first pose based at least on the correspondence(s) and the difference(s). In some examples, the error component 112 may determine the error based at least on one or more additional factors, such as a previous error associated with the previous pose of the machine. In some examples, the error component 112 may determine additional information associated with the error, such as an uncertainty associated with the error. Still, in some examples, the error component 112 may perform one or more processes based at least on the error, such as determine a mode of operation associated with the machine.

FIG. 14 illustrates a flow diagram showing a method 1400 for determining a mode of operation based at least on one or more errors associated with localization, in accordance with some embodiments of the present disclosure. The method 1400, at block B1402, may include determining, using a localization system and based at least on sensor data, a pose associated with a machine. For instance, the localization component 102 may use at least a portion of the sensor data 104, such as the sensor data 104 generated using one or more location sensors (e.g., a GPS), to determine an initial pose associated with the machine. The localization component 102 may then use at least another portion of the sensor data 104 and the map data 106 to refine the initial pose in order to determine the pose (e.g., an estimated pose, a localization pose, etc.). In some examples, and as described herein, the localization component 102 refines the initial pose using at least feature matching.

The method 1400, at block B1404, may include determining, based at least on a localization error and a motion error, one or more errors associated with the pose. For instance, the error component 112 may use one or more of the techniques described herein to determine the error(s) associated with the pose. For example, the error component 112 may determine the error(s) based on the localization error, such as feature mapping between the sensor data 104 and the map data, and the motion error, such as one or more differences between the pose and another pose determined using motion data.

The method 1400, at block B1406, may include determining whether the one or more errors satisfy one or more error thresholds. For instance, the mode component 118 may determine whether the error(s) satisfies the error threshold(s). As described herein, the determining may include determining whether a first error associated with the x-coordinate distance satisfies a first error threshold (e.g., a first distance threshold), a second error associated with the y-coordinate distance satisfies a second error threshold (e.g., a second distance threshold), a third error associated with the z-coordinate distance satisfies a third error threshold (e.g., a third distance threshold), a fourth error associated with the yaw satisfies a fourth error threshold, a fifth error associated with the pitch satisfies a fifth error threshold, and/or a sixth error associated with the roll satisfies a sixth error threshold.

If, at Block B1406, it is determined that the one or more errors do not satisfy the one or more error thresholds, then the method 1400, at block B1408, may include causing the machine to operate in a first mode. For instance, if the mode component 118 determines that the error(s) does not satisfy the error threshold(s), then the mode component 118 may cause the machine to operate in the first mode. As described herein, in the first mode, the machine may not output the pose associated with localization and/or the machine may not use the pose to perform one or more operations.

However, if, at Block B1406, it is determined that the one or more errors satisfy the one or more error thresholds, then the method 1400, at block B1410, may include causing the machine to operate in a second mode. For instance, if the mode component 118 determines that the error(s) satisfies the error threshold(s), then the mode component 118 may cause the machine to operate in the second mode. As described herein, in the second mode, the machine may output the pose associated with localization and/or the machine may use the pose to perform one or more operations.

Example Autonomous Vehicle

Figure 15A:
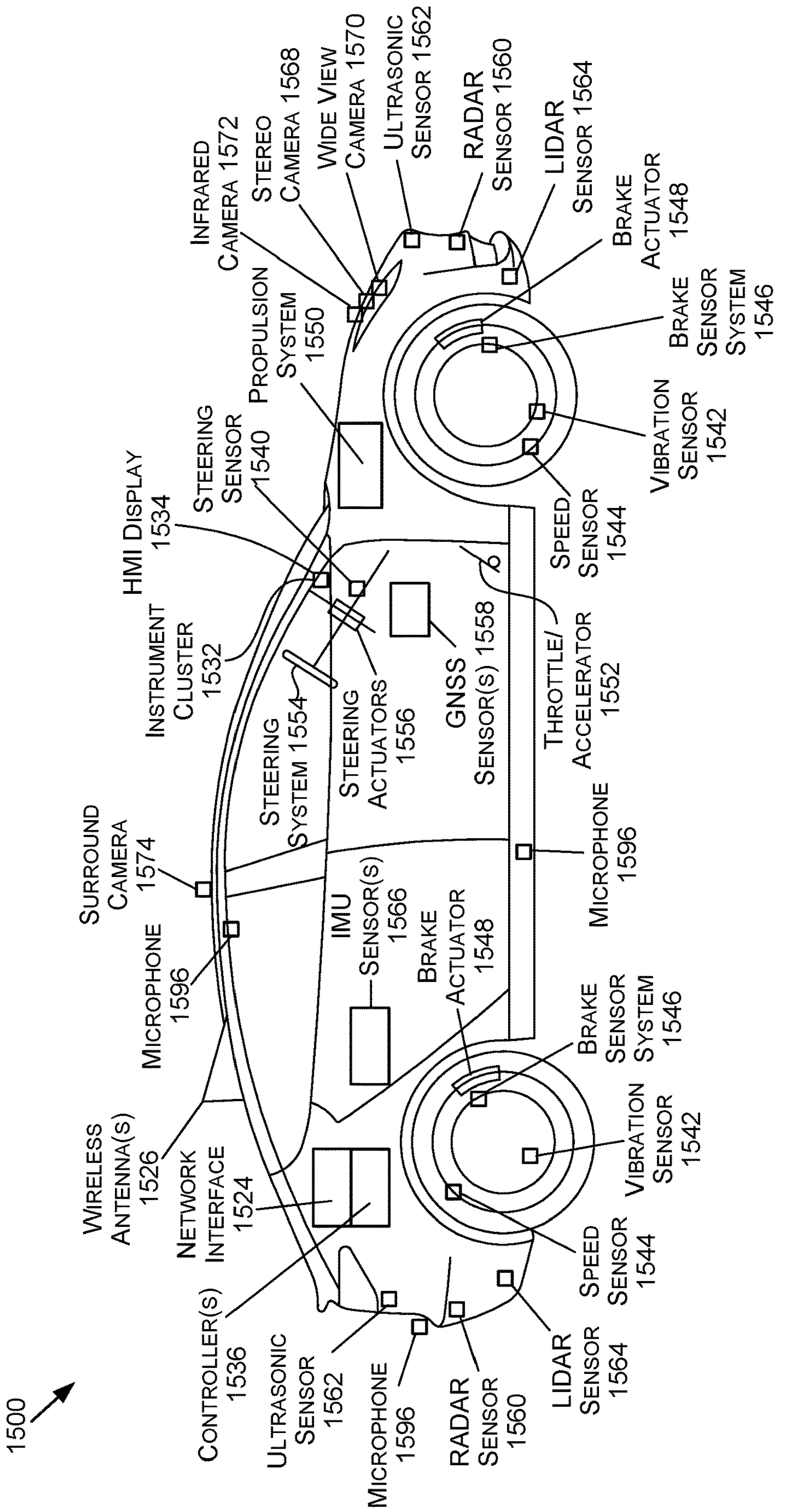
FIG. 15A is an illustration of an example autonomous vehicle, in accordance with some embodiments of the present disclosure.

FIG. 15A is an illustration of an example autonomous vehicle 1500, in accordance with some embodiments of the present disclosure. The autonomous vehicle 1500 (alternatively referred to herein as the "vehicle 1500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201306, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. The vehicle 1500 may be capable of functionality in accordance with one or more of Level 1-Level 5 of the autonomous driving levels. For example, the vehicle 1500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1500 or other machine, such as being fully autonomous, being highly autonomous, being conditionally autonomous, being partially autonomous, providing assistive autonomy, being semi-autonomous, being primarily autonomous, or other designation.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems ("GNSS") sensor(s) 1558 (e.g., Global Positioning System sensor(s)), RADAR sensor(s) 1560, ultrasonic sensor(s) 1562, LiDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the High Definition ("HD") map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 15B:
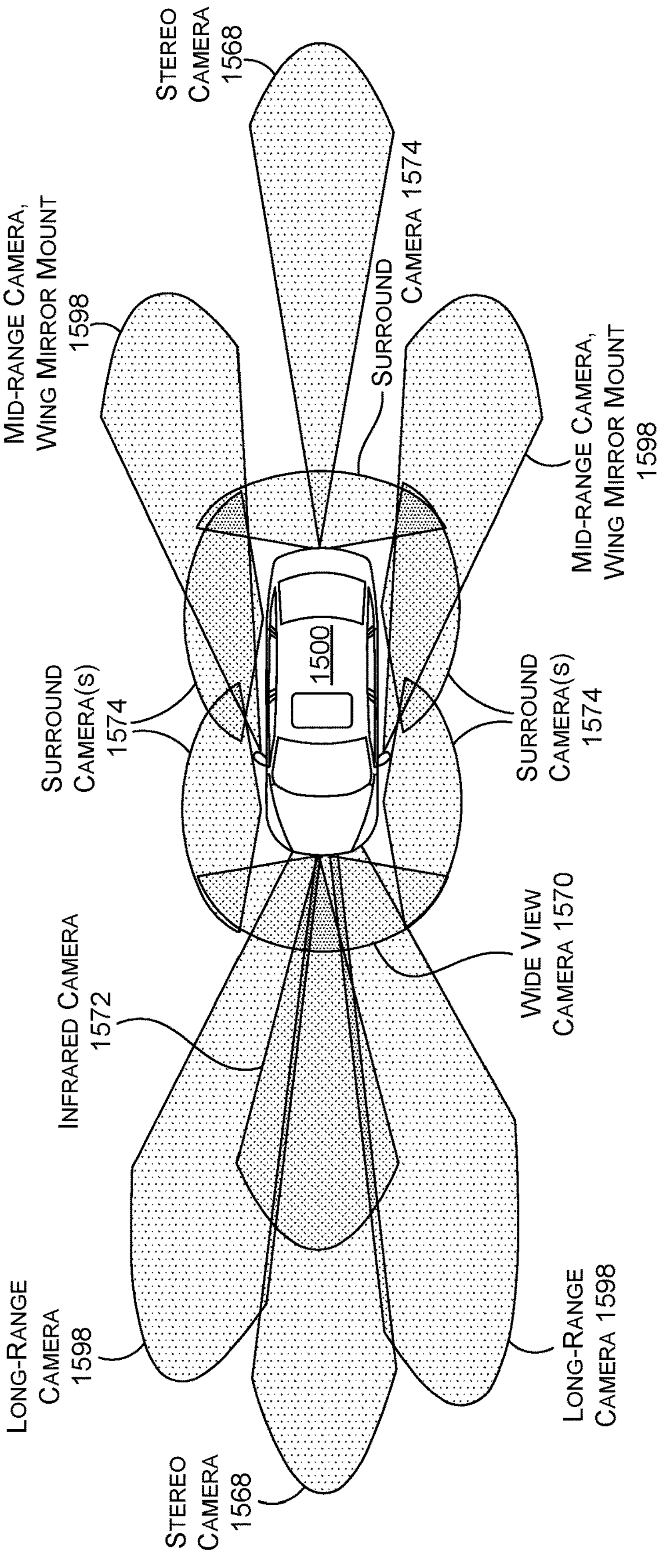
FIG. 15B is an example of camera locations and fields of view for the example autonomous vehicle of FIG. 15A, in accordance with some embodiments of the present disclosure.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may be any number (including zero) of wide-view cameras 1570 on the vehicle 1500. In addition, any number of long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

Any number of stereo cameras 1568 may also be included in a front-facing configuration. In at least one embodiment, one or more of stereo camera(s) 1568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

Figure 15C:
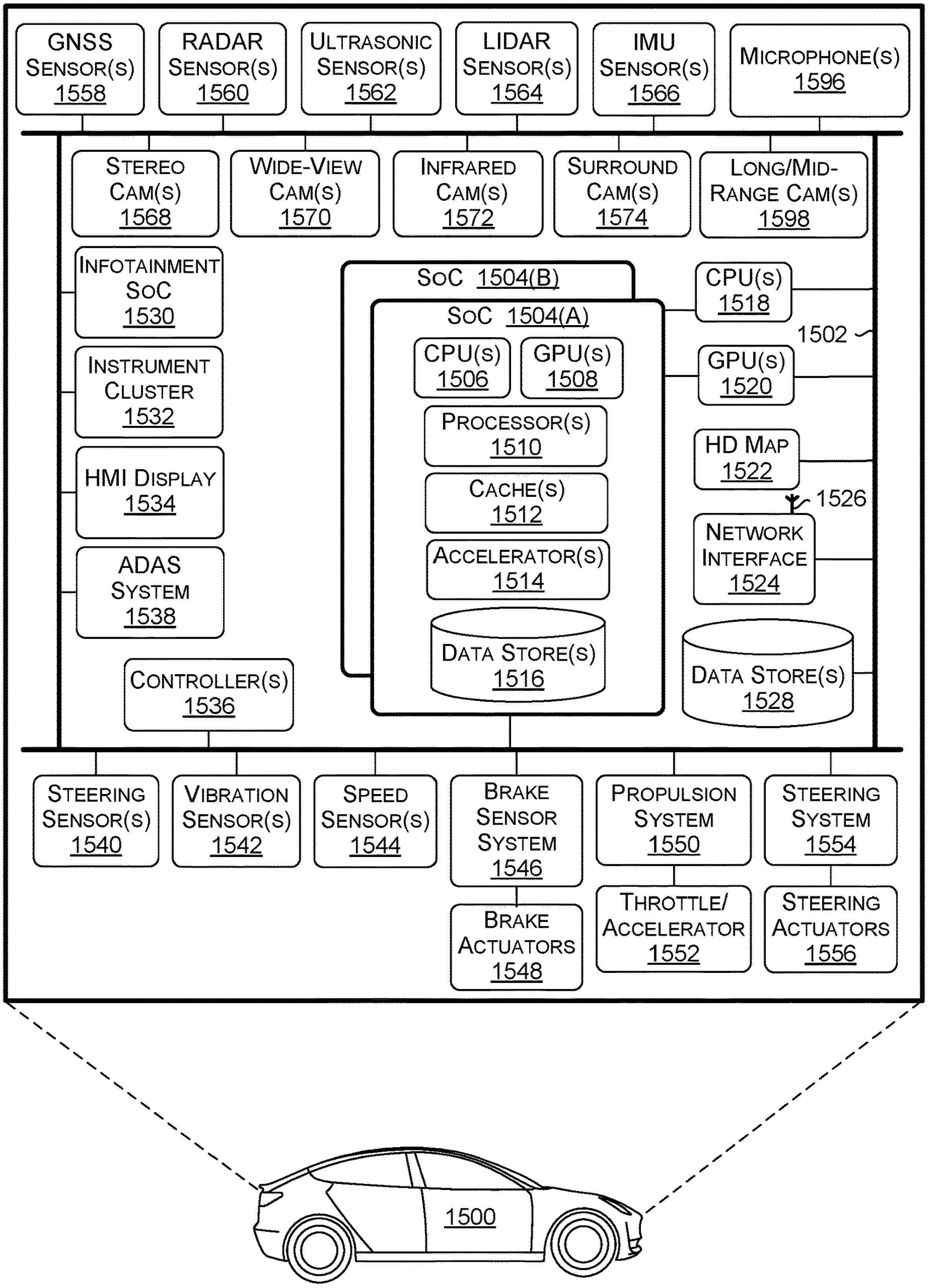
FIG. 15C is a block diagram of an example system architecture for the example autonomous vehicle of FIG. 15A, in accordance with some embodiments of the present disclosure.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LiDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1512 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LiDAR sensor(s) 1564, RADAR sensor(s) 1560, etc. that may be connected over Ethernet), data from bus 1502 (e.g., speed of vehicle 1500, steering wheel position, etc.), data from GNSS sensor(s)

1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS, assisted GPS sensors, differential GPS (DGPS) sensors, etc.), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LiDAR sensor(s) 1564. The LiDAR sensor(s) 1564 may be used for object and pedestrian detection, emergency braking, collision avoidance, and/or other functions. The LiDAR sensor(s) 1564 may be functional safety level ASIL B. In some examples, the vehicle 1500 may include multiple LiDAR sensors 1564 (e.g., two, four, six, etc.) that may use Ethernet (e.g., to provide data to a Gigabit Ethernet switch).

In some examples, the LiDAR sensor(s) 1564 may be capable of providing a list of objects and their distances for a 360-degree field of view. Commercially available LiDAR sensor(s) 1564 may have an advertised range of approximately 1500 m, with an accuracy of 2 cm-3 cm, and with support for a 1500 Mbps Ethernet connection, for example. In some examples, one or more non-protruding LiDAR sensors 1564 may be used. In such examples, the LiDAR sensor(s) 1564 may be implemented as a small device that may be embedded into the front, rear, sides, and/or corners of the vehicle 1500. The LiDAR sensor(s) 1564, in such examples, may provide up to a 120-degree horizontal and 35-degree vertical field-of-view, with a 200 m range even for low-reflectivity objects. Front-mounted LiDAR sensor(s) 1564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LiDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1500), while the I2V communication concept provides information about traffic further ahead. CACC systems may include either or both I2V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, Wi-Fi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

Figure 15D:
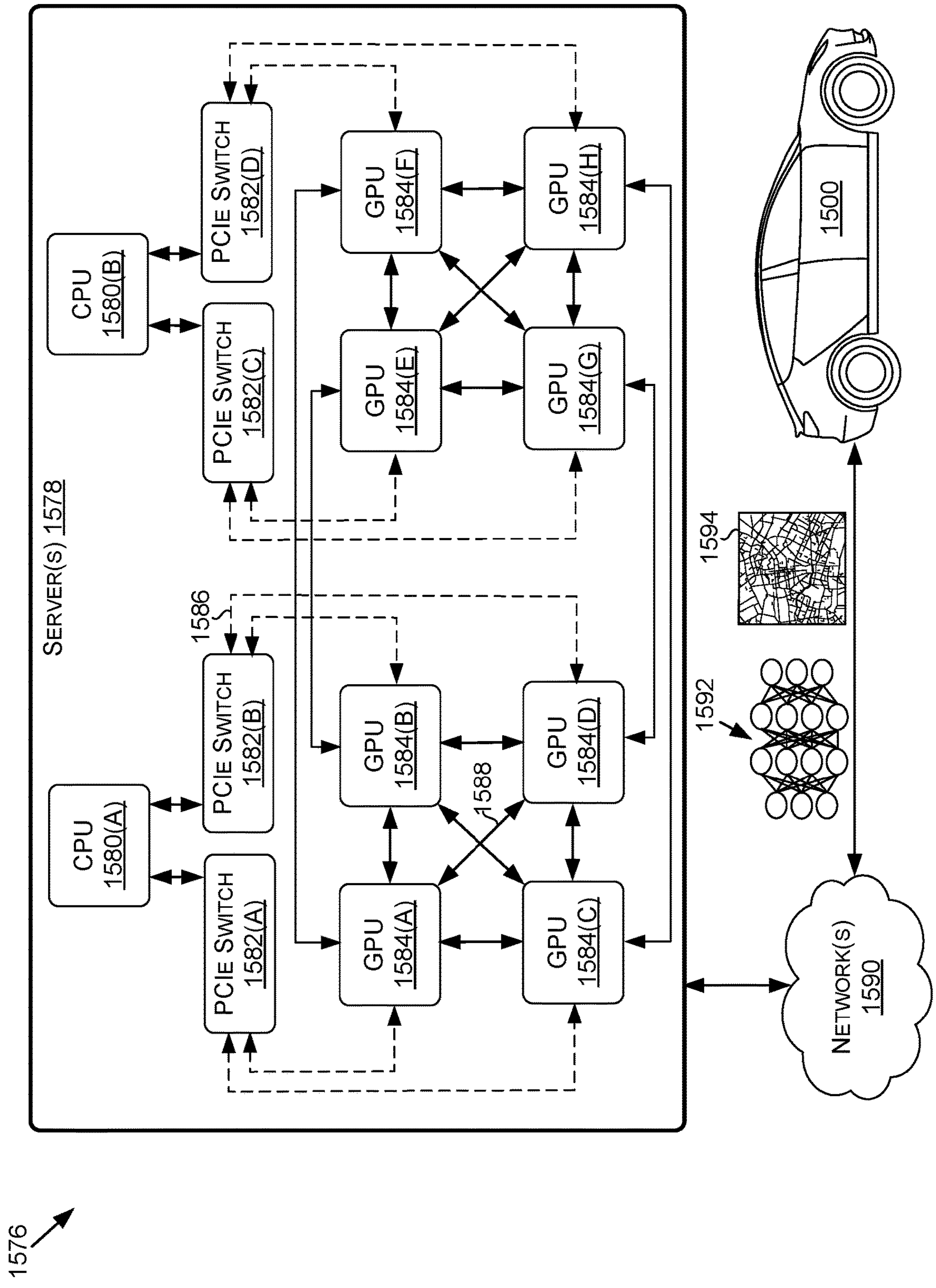
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1584(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 16:
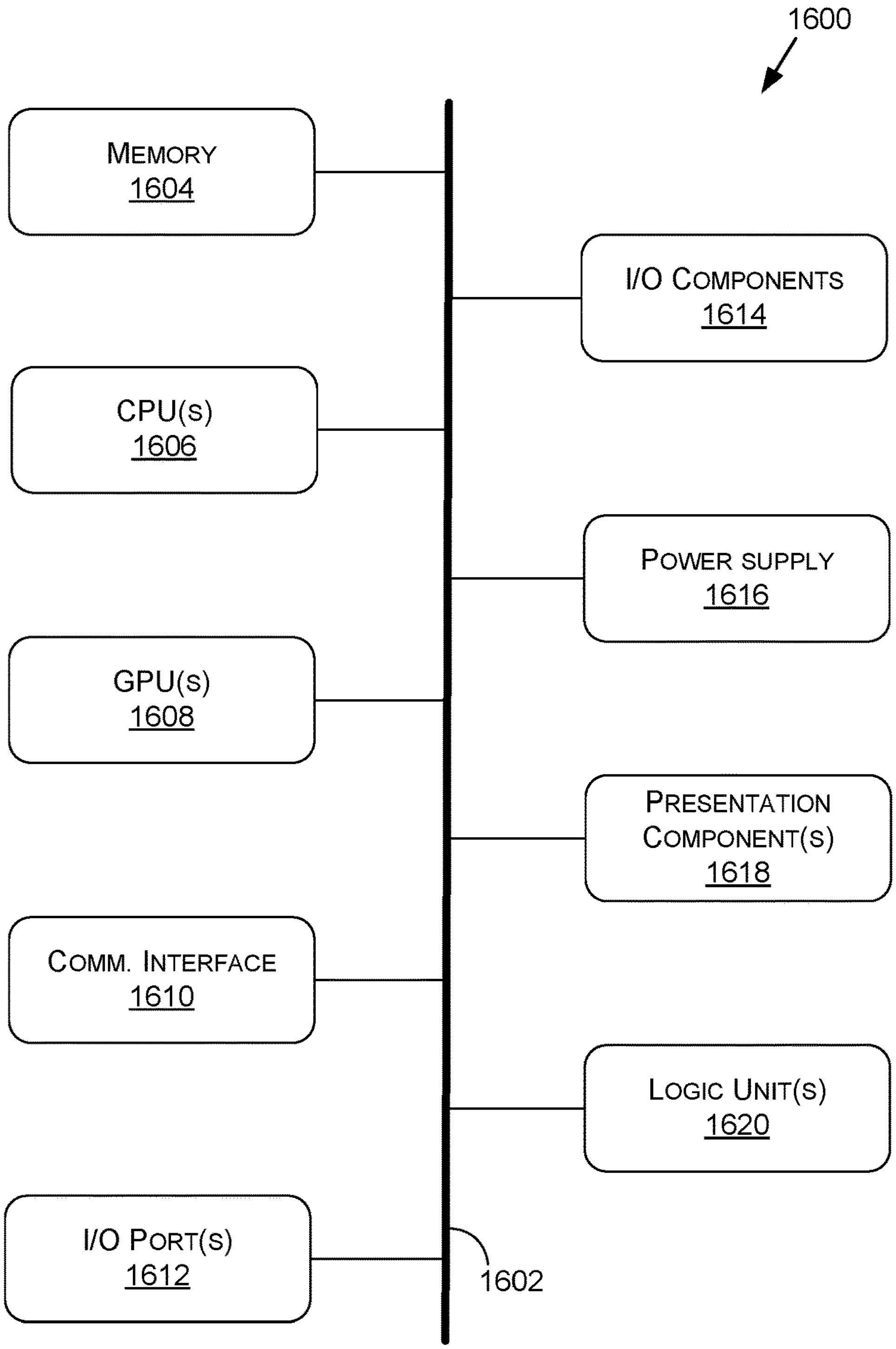
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, one or more presentation components 1618 (e.g., display(s)), and one or more logic units 1620. In at least one embodiment, the computing device(s) 1600 may comprise one or more virtual machines (VMs), and/or any of the components thereof may comprise virtual components (e.g., virtual hardware components). For non-limiting examples, one or more of the GPUs 1608 may comprise one or more vGPUs, one or more of the CPUs 1606 may comprise one or more vCPUs, and/or one or more of the logic units 1620 may comprise one or more virtual logic units. As such, a computing device(s) 1600 may include discrete components (e.g., a full GPU dedicated to the computing device 1600), virtual components (e.g., a portion of a GPU dedicated to the computing device 1600), or a combination thereof.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606 and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1610 may include one or more receivers, transmitters, and/or transceivers that enable the computing device 1600 to communicate with other computing devices via an electronic communication network, included wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1620 and/or communication interface 1610 may include one or more data processing units (DPUs) to transmit data received over a network and/or through interconnect system 1602 directly to (e.g., a memory of) one or more GPU(s) 1608.

The I/O ports 1612 may enable the computing device 1600 to be logically coupled to other devices including the I/O components 1614, the presentation component(s) 1618, and/or other components, some of which may be built in to (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, DPUs, etc.), and output the data (e.g., as an image, video, sound, etc.).

Example Data Center

Figure 17:
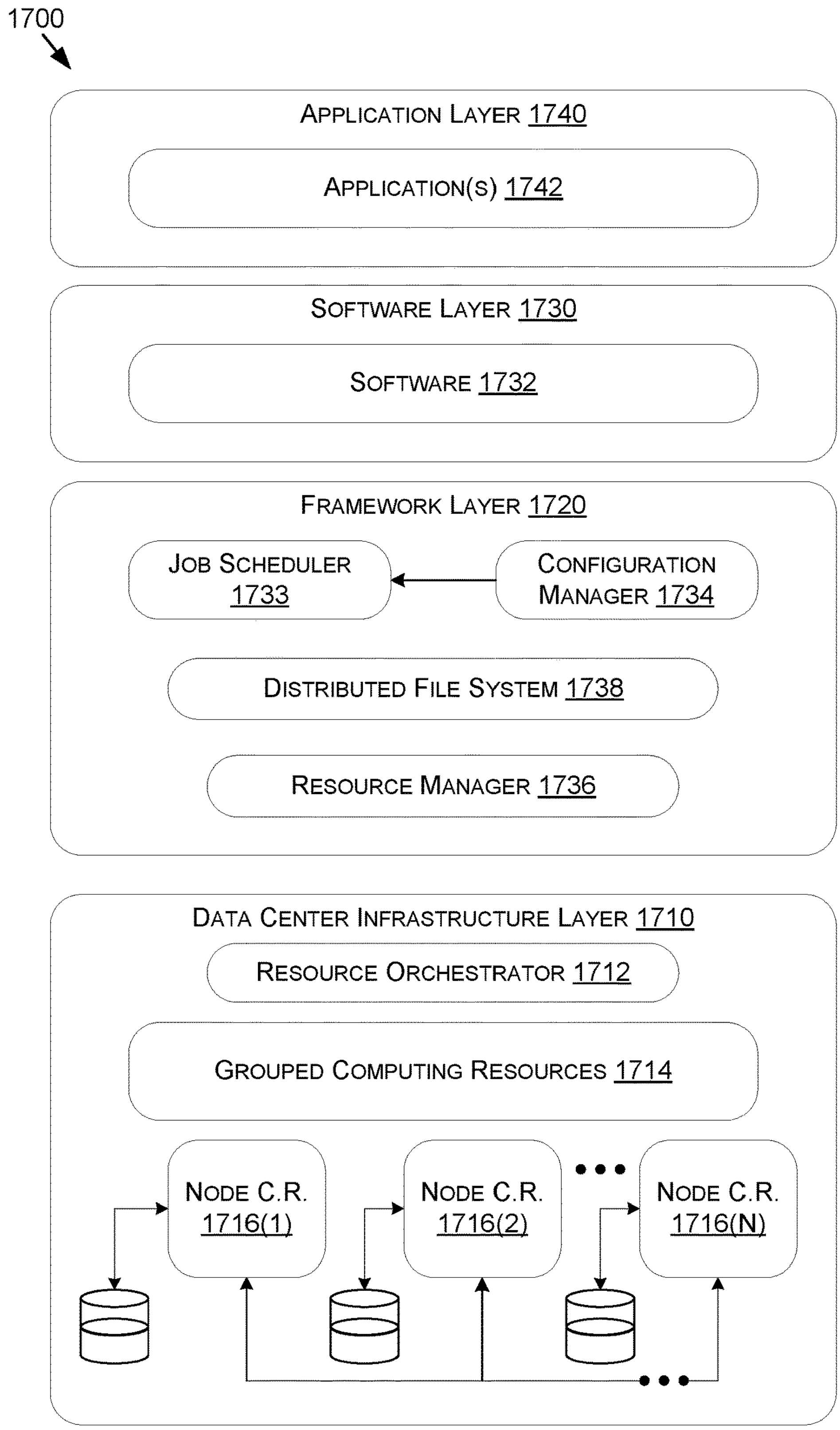
FIG. 17 is a block diagram of an example data center suitable for use in implementing some embodiments of the present disclosure.

FIG. 17 illustrates an example data center 1700 that may be used in at least one embodiments of the present disclosure. The data center 1700 may include a data center infrastructure layer 1710, a framework layer 1720, a software layer 1730, and/or an application layer 1740.

As shown in FIG. 17, the data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units (CPUs) or other processors (including DPUs, accelerators, field programmable gate arrays (FPGAs), graphics processors or graphics processing units (GPUS), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1716(1)-1716(N) may correspond to a server having one or more of the above-mentioned computing resources. In addition, in some embodiments, the node C.R.s 1716(1)-17161 (N) may include one or more virtual components, such as vGPUs, vCPUs, and/or the like, and/or one or more of the node C.R.s 1716(1)-1716(N) may correspond to a virtual machine (VM).

In at least one embodiment, grouped computing resources 1714 may include separate groupings of node C.R.s 1716 housed within one or more racks (not shown), or many racks housed in data centers at various geographical locations (also not shown). Separate groupings of node C.R.s 1716 within grouped computing resources 1714 may include grouped compute, network, memory or storage resources that may be configured or allocated to support one or more workloads. In at least one embodiment, several node C.R.s 1716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1712 may configure or otherwise control one or more node C.R.s 1716(1)-1716(N) and/or grouped computing resources 1714. In at least one embodiment, resource orchestrator 1712 may include a software design infrastructure (SDI) management entity for the data center 1700. The resource orchestrator 1712 may include hardware, software, or some combination thereof.

In at least one embodiment, as shown in FIG. 17, framework layer 1720 may include a job scheduler 1733, a configuration manager 1734, a resource manager 1736, and/or a distributed file system 1738. The framework layer 1720 may include a framework to support software 1732 of software layer 1730 and/or one or more application(s) 1742 of application layer 1740. The software 1732 or application(s) 1742 may respectively include web-based service software or applications, such as those provided by Amazon Web Services, Google Cloud and Microsoft Azure. The framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1733 may include a Spark driver to facilitate scheduling of workloads supported by various layers of data center 1700. The configuration manager 1734 may be capable of configuring different layers such as software layer 1730 and framework layer 1720 including Spark and distributed file system 1738 for supporting large-scale data processing. The resource manager 1736 may be capable of managing clustered or grouped computing resources mapped to or allocated for support of distributed file system 1738 and job scheduler 1733. In at least one embodiment, clustered or grouped computing resources may include grouped computing resource 1714 at data center infrastructure layer 1710. The resource manager 1736 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716 (1)-1716(N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. Self-modifying actions may relieve a data center operator of data center 1700 from making possibly bad configuration decisions and possibly avoiding underutilized and/or poor performing portions of a data center.

The data center 1700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1700. In at least one embodiment, trained or deployed machine learning models corresponding to one or more neural networks may be used to infer or predict information using resources described above with respect to the data center 1700 by using weight parameters calculated through one or more training techniques, such as but not limited to those described herein.

In at least one embodiment, the data center 1700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1600 of FIG. 16—e.g., each device may include similar components, features, and/or functionality of the computing device(s) 1600. In addition, where backend devices (e.g., servers, NAS, etc.) are implemented, the backend devices may be included as part of a data center 1700, an example of which is described in more detail herein with respect to FIG. 17.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, based at least on motion data obtained using one or more motion sensors of a machine, a first pose associated with the machine within an environment;

determining, based at least on one or more correspondences between one or more first features represented by sensor data obtained using one or more sensors of the machine and one or more second features represented by map data, a second pose of the machine within the environment;

after the determining the second pose:

determining a first error corresponding to the second pose based at least on one or more differences between the first pose and the second pose associated with the machine; and determining a second error corresponding to the second pose based at least on the one or more correspondences between the one or more first features represented by the sensor data and the one or more second features represented by the map data;

determining, based at least on the first error and the second error, a third error corresponding to the second pose; and causing, based at least on the third error corresponding to the second pose, the machine to navigate from a first location within an environment to a second location within the environment.

2. The method of claim 1, further comprising:

determining, based on one of the one or more differences or the one or more correspondences, an uncertainty associated with the third error, wherein the causing the machine to navigate from the first location within the environment to the second location within the environment is further based at least on the uncertainty.

3. The method of claim 1, wherein the determining the second pose comprises:

comparing the one or more first features represented by the sensor data to the one or more second features represented by the map data;

determining one or more costs based at least on the comparing; and determining, based at least on the one or more costs, the second pose associated with the machine.

4. The method of claim 1, wherein the determining the first pose associated with the machine comprises:

determining a third pose associated with the machine;

determining, based at least on the motion data, motion of the machine that includes at least one of a direction of travel of the machine, a distance of travel of the machine, or a change in a yaw angle associated with the machine; and determining, based at least on the third pose associated with the machine and the motion of the machine, the first pose associated with the machine.

5. The method of claim 1, further comprising:

determining that the sensor data represents the one or more first features;

determining whether the one or more first features represented by the sensor data match the one or more second features represented by the map data; and determining the one or more correspondences based at least on whether the one or more first features represented by the sensor data match the one or more second features represented by the map data.

6. The method of claim 1, further comprising:

determining whether the third error is less than or equal to an error threshold; and determining, based at least on the third error being less than or equal to the error threshold, to cause the machine to use the second pose to navigate within the environment.

7. The method of claim 1, further comprising:

determining, based at least on second motion data obtained using the one or more motion sensors of the machine, a third pose associated with the machine;

determining one or more second differences between the third pose and a fourth pose associated with the machine, the fourth pose determined using second sensor data obtained using the one or more sensors of the machine;

determining one or more second correspondences between one or more third features represented by the second sensor data and one or more fourth features represented by the map data; and determining, based at least on the one or more second differences and the one or more second correspondences, a fourth error associated with the fourth pose, wherein the determining the third error is further based at least on the second error.

8. The method of claim 1, wherein the third error includes one or more of:

a first error associated with a x-coordinate direction;

a second error associated with a y-coordinate direction;

a third error associated with a z-coordinate direction;

a fourth error associated with a yaw;

a fifth error associated with a roll; or a sixth error associated with a pitch.

9. A system comprising:

one or more processors to:

determine, using one or more first components of a machine, a first pose associated with a machine using motion data and a second pose associated with the machine using sensor data;

based at least on the second pose being determined using the sensor data, determine, using one or more second components of the machine that are different from the one or more first components, at least:

one or more differences between the first pose and the second pose;

one or more correspondences between one or more first features represented by the sensor data and one or more second features represented by map data; and an error associated with the second pose based at least on the one or more differences and the one or more correspondences; and cause, based at least on the error associated with the second pose, the machine to navigate from a first location within an environment to a second location within the environment.

10. The system of claim 9, wherein the one or more processors are further to determine, based at least on at least one of the one or more differences or the one or more correspondences, an uncertainty associated with the error.

11. The system of claim 9, wherein the determination of the second pose comprises:

compare the one or more first features represented by the sensor data to the one or more second features represented by the map data;

determine one or more costs based at least on the comparison; and determine, using the one or more first components and based at least on the one or more costs, the second pose associated with the machine.

12. The system of claim 9, wherein the determination of the first pose comprises:

determine a third pose associated with the machine;

determine, based at least on the motion data, motion of the machine that includes at least one of a direction of travel of the machine, a distance of travel of the machine, or a change in a yaw angle associated with the machine; and determine, using the one or more first components and based at least on the third pose associated with the machine and the motion of the machine, the first pose associated with the machine.

13. The system of claim 9, wherein the determination of the error associated with the second pose comprises:

determining, using the one or more second components, a second error based at least on the one or more differences;

determining, using the one or more second components, a third error based at least on the one or more correspondences; and determining, using the one or more second components, the error based at least on the second error and the third error.

14. The system of claim 9, wherein the one or more processors are further to:

determine whether the error is less than or equal to an error threshold; and determine, based at least on the error being greater than the error threshold, to cause the machine to use the first pose to navigate within the environment.

15. The system of claim 9, wherein the one or more processors are further to:

determine one or more second differences between a third pose determined using second motion data and a fourth pose determined using second sensor data;

determine one or more second correspondences between one or more third features represented by the second sensor data and one or more fourth features represented by the map data; and determine, based at least on the one or more second differences and the one or more second correspondences, a second error associated with the fourth pose, wherein the error is further determined based at least on the second error.

16. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implemented using large language models (LLMs);

a system for performing one or more generative AI operations;

a system for performing conversational AI operations;

a system for generating synthetic data;

a system incorporating one or more virtual machines (VMs);

a system implemented at least partially in a data center; or a system implemented at least partially using cloud computing resources.

17. One or more processors comprising processing circuitry to:

determine a first pose associated with a machine using motion data;

determine, based at least on one or more first correspondences between one or more first features represented by sensor data and one or more second features represented by map data, a second pose associated with the machine;

based at least on the second pose being determined:

determine a first error corresponding to the second pose based at least on the first pose and the second pose;

determine a second error corresponding to the second pose based at least on one or more second correspondences between one or more third features represented by the sensor data and one or more fourth features represented by the map data; and determine a third error corresponding to the second pose based at least on the first error and the second error; and cause, based at least on the third error corresponding to the second pose, the machine to navigate from a first location within an environment to a second location within the environment.

18. The one or more processors of claim 17, wherein the processing circuitry is further to determine an uncertainty associated with the third error.

19. The one or more processors of claim 17, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implemented using large language models (LLMs);

a system for performing one or more generative AI operations;

a system for performing conversational AI operations;

a system for generating synthetic data;

a system incorporating one or more virtual machines (VMs);

a system implemented at least partially in a data center; or a system implemented at least partially using cloud computing resources.

20. The one or more processors of claim 17, wherein the one or more second correspondences are determined using the second pose associated with the machine.

* * * * *